(12) United States Patent
Igarashi et al.

(10) Patent No.: US 12,441,320 B2
(45) Date of Patent: Oct. 14, 2025

(54) TRAVELING CONTROL APPARATUS

(71) Applicant: SUBARU CORPORATION, Tokyo (JP)

(72) Inventors: Yoshiyuki Igarashi, Tokyo (JP); Tsubasa Aoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 159 days.

(21) Appl. No.: 18/348,659

(22) Filed: Jul. 7, 2023

(65) Prior Publication Data
US 2024/0043009 A1    Feb. 8, 2024

(30) Foreign Application Priority Data

Aug. 4, 2022   (JP) ................................ 2022-124946

(51) Int. Cl.
  *B60W 30/18* (2012.01)
  *B60W 30/09* (2012.01)
  *B60W 30/095* (2012.01)

(52) U.S. Cl.
  CPC ...... *B60W 30/18163* (2013.01); *B60W 30/09* (2013.01); *B60W 30/0956* (2013.01); *B60W 2554/80* (2020.02)

(58) Field of Classification Search
  CPC ........... B60W 30/18163; B60W 30/09; B60W 30/0956; B60W 2554/80; B60W 2554/20; B60W 2554/4042; B60W 2554/801; B60W 2554/802; B60W 2554/804; B60W 30/12
  See application file for complete search history.

(56) References Cited

U.S. PATENT DOCUMENTS

2022/0234615 A1*   7/2022  Nishino ............. B60W 60/0011

FOREIGN PATENT DOCUMENTS

JP    2011-162075 A    8/2011

* cited by examiner

*Primary Examiner* — Lindsay M Low
*Assistant Examiner* — Charles J Brauch
(74) *Attorney, Agent, or Firm* — Rimon P.C.

(57) ABSTRACT

A travel control apparatus to be applied to a vehicle includes a passability determination unit and a travel control unit. The passability determination unit performs a determination as to whether or not an obstacle located on a vehicle lane on which the vehicle travels is avoidable within the vehicle lane on which the vehicle is currently traveling. The travel control unit carries out a travel control to allow the vehicle to travel while avoiding the obstacle. On the condition that the passability determination unit determines that the obstacle is avoidable within the vehicle lane on which the vehicle is currently traveling, the travel control unit controls a travel speed of the vehicle to keep the vehicle, any one of surrounding vehicles, and the obstacle from becoming side by side when the vehicle passes by the obstacle.

7 Claims, 16 Drawing Sheets

TRAVELING CONTROL APPARATUS

CROSS-REFERENCE TO RELATED APPLICATIONS

The present application claims priority from Japanese Patent Application No. 2022-124946 filed on Aug. 4, 2022, the entire contents of which are hereby incorporated by reference.

BACKGROUND

The disclosure relates to a travel control apparatus. Driver assistance systems assist a driver of a vehicle in making driving operations. In recent years, driver assistance systems have been put into practical use and have become pervasive for the purpose of contributing to safe travel of vehicles while reducing a burden on a driver of a vehicle such as an automobile in making driving operations.

Such driver assistance systems provide driver assistance in accordance with driving characteristics of a driver while restraining themselves from giving the driver the sense of discomfort. Thus, driver assistance systems have made considerable advancements. For example, reference is made to Japanese Unexamined Patent Application Publication (JP-A) No. 2011-162075.

SUMMARY

An aspect of the disclosure provides a travel control apparatus to be applied to a vehicle. The travel control apparatus includes a passability determination unit and a travel control unit. The passability determination unit is configured to perform a determination as to whether or not an obstacle located on a vehicle lane on which the vehicle travels is avoidable within the vehicle lane on which the vehicle is currently traveling, based on a travelable width, a vehicle width of the vehicle, and a margin. The travelable width is a width of a travelable region within the vehicle lane, with one of both sides of the travelable region defined by the obstacle. The margin is a distance from the vehicle to the obstacle when the vehicle passes by the obstacle. The travel control unit is configured to carry out a travel control to allow the vehicle to travel while avoiding the obstacle, based on a result of the determination by the passability determination unit, an obstacle-reaching distance, and surrounding vehicle data. The obstacle-reaching distance is a distance from the vehicle to the obstacle located on the vehicle lane on which the vehicle travels. The surrounding vehicle data includes data regarding positions and travel speeds of respective surrounding vehicles traveling on the vehicle lane on which the vehicle travels and an adjacent vehicle lane. The travel control unit is configured to, when the passability determination unit determines that the obstacle is avoidable within the vehicle lane on which the vehicle is currently traveling, control a travel speed of the vehicle to keep the vehicle, any one of the surrounding vehicles, and the obstacle from becoming side by side when the vehicle passes by the obstacle.

An aspect of the disclosure provides a travel control apparatus to be applied to a vehicle. The travel control apparatus includes circuitry. The circuitry is configured to perform a determination as to whether or not an obstacle located on a vehicle lane on which the vehicle travels is avoidable within the vehicle lane on which the vehicle is currently traveling, based on a travelable width, a vehicle width of the vehicle, and a margin. The travelable width is a width of a travelable region within the vehicle lane, with one of both sides of the travelable region defined by the obstacle. The margin is a distance from the vehicle to the obstacle when the vehicle passes by the obstacle. The circuitry is configured to carry out a travel control to allow the vehicle to travel while avoiding the obstacle, based on a result of the determination, an obstacle-reaching distance, and surrounding vehicle data. The obstacle-reaching distance is a distance from the vehicle to the obstacle located on the vehicle lane on which the vehicle travels. The surrounding vehicle data includes data regarding positions and travel speeds of respective surrounding vehicles traveling on the vehicle lane on which the vehicle travels and an adjacent vehicle lane. The circuitry is configured to, upon determining that the obstacle is avoidable within the vehicle lane on which the vehicle is currently traveling, control a travel speed of the vehicle to keep the vehicle, any one of the surrounding vehicles, and the obstacle from becoming side by side when the vehicle passes by the obstacle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
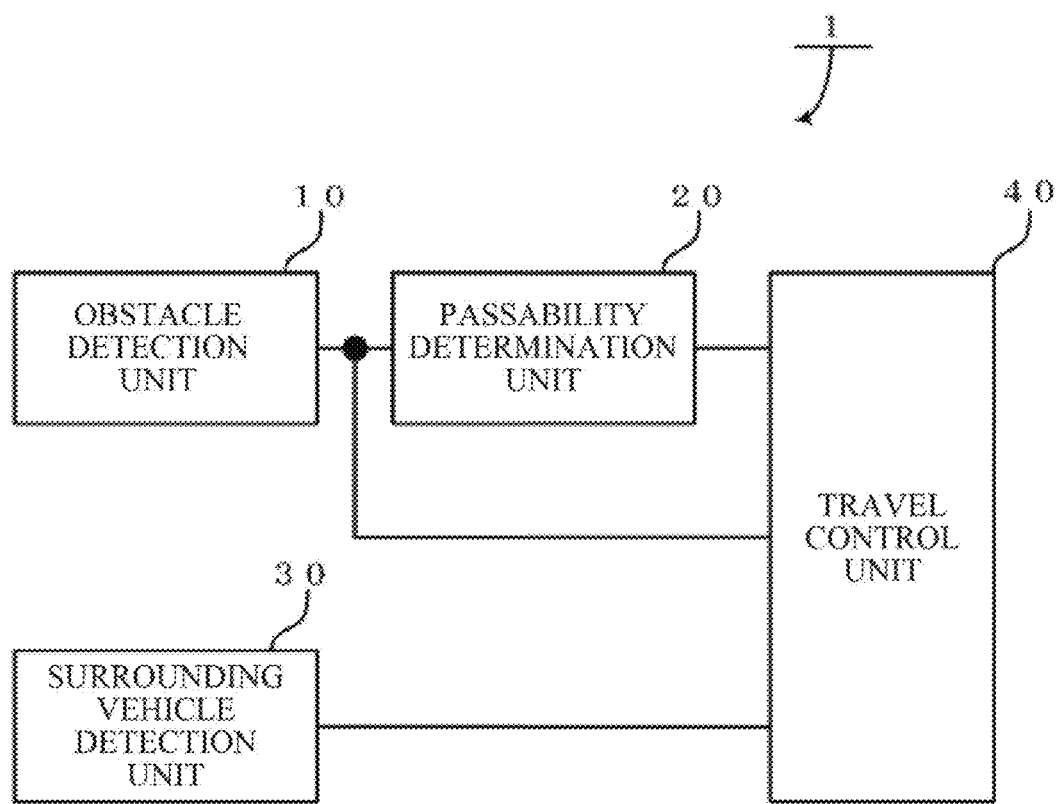
FIG. 1 is a block diagram of a configuration of a travel control apparatus according to a first embodiment of the disclosure.

When a vehicle passes by while avoiding an obstacle located on a vehicle lane on which the vehicle travels, even an advanced driver assistance system as described in JP-A No. 2011-162075 may sometimes allow the vehicle to pass by the obstacle without carrying out a control to reduce a speed of the vehicle, if the driver assistance system determines that the vehicle is able to pass by the obstacle.

This may evoke the sense of fear in an occupant of the vehicle about possible collision with the obstacle when the vehicle passes by the obstacle to avoid the obstacle.

It is desirable to provide a travel control apparatus that makes it possible to provide driver assistance without evoking the sense of fear in an occupant of a vehicle when the vehicle passes by while avoiding an obstacle located on a vehicle lane on which the vehicle travels.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Embodiment

A travel control apparatus 1 according to a first embodiment of the disclosure is described with reference to FIGS. 1 to 10.

<Configuration of Travel Control Apparatus 1>

As illustrated in FIG. 1, the travel control apparatus 1 according to the first embodiment may include, for example, an obstacle detection unit 10, a passability determination unit 20, a surrounding vehicle detection unit 30, and a travel control unit 40.

The obstacle detection unit 10 may detect a travelable width and an obstacle-reaching distance. The travelable width is a width of a travelable region within a vehicle lane on which a vehicle MV travels, with one or both sides of the travelable region defined by obstacles located on the vehicle lane on which the vehicle MV travels. For example, the travelable width may be a distance between both sideward obstacles on the vehicle lane on which the vehicle MV travels. The obstacle-reaching distance is a distance from the vehicle MV to the obstacle.

The obstacle detection unit 10 may include, for example, an image analyzing device. The obstacle detection unit 10 may detect the travelable width and the obstacle-reaching distance mentioned above by performing image analysis of image data regarding a forward view ahead of the vehicle MV.

Moreover, the obstacle detection unit 10 may perform image analysis and determine whether or not the detected obstacle is a vehicle.

It is to be noted that the obstacle detection unit 10 may further include, for example, LIDAR and millimeter-wave radar, to detect the travelable width and the obstacle-reaching distance.

Here, data to be detected by the obstacle detection unit 10 is described with reference to FIG. 2.

Figure 2:
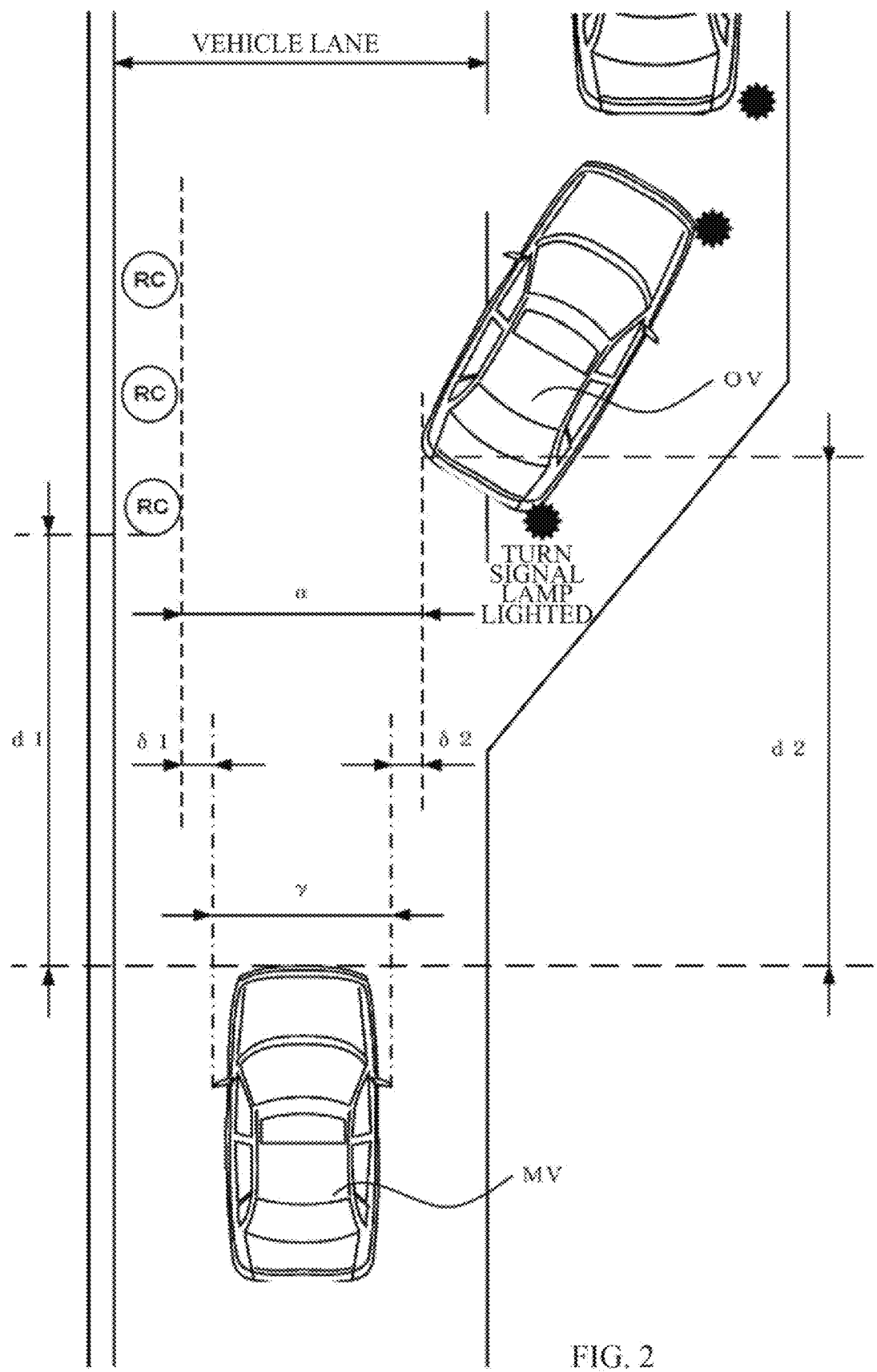
FIG. 2 is a diagram illustrating data to be detected by an obstacle detection unit of the travel control apparatus according to the first embodiment of the disclosure.

FIG. 2 illustrates road cones RC for construction work and a vehicle, as obstacles located on a vehicle lane on which the vehicle MV travels. The vehicle as the obstacle has half entered a right-turn lane and is stopped to turn right at an intersection ahead.

The obstacle detection unit 10 may detect a travelable width α and an obstacle-reaching distance d. The travelable width α may be a distance from the road cones RC to the obstacle OV located on the vehicle lane on which the vehicle MV travels. The obstacle-reaching distance d is a distance from the vehicle MV to each obstacle. If there are both sideward obstacles, the obstacle detection unit 10 may detect the obstacle-reaching distances d1 and d2.

The obstacle detection unit 10 may transmit the detected travelable width α to the passability determination unit 20 described later.

The obstacle detection unit 10 may also transmit a detected value of the obstacle-reaching distance d to the travel control unit 40 described later.

Figure 3:
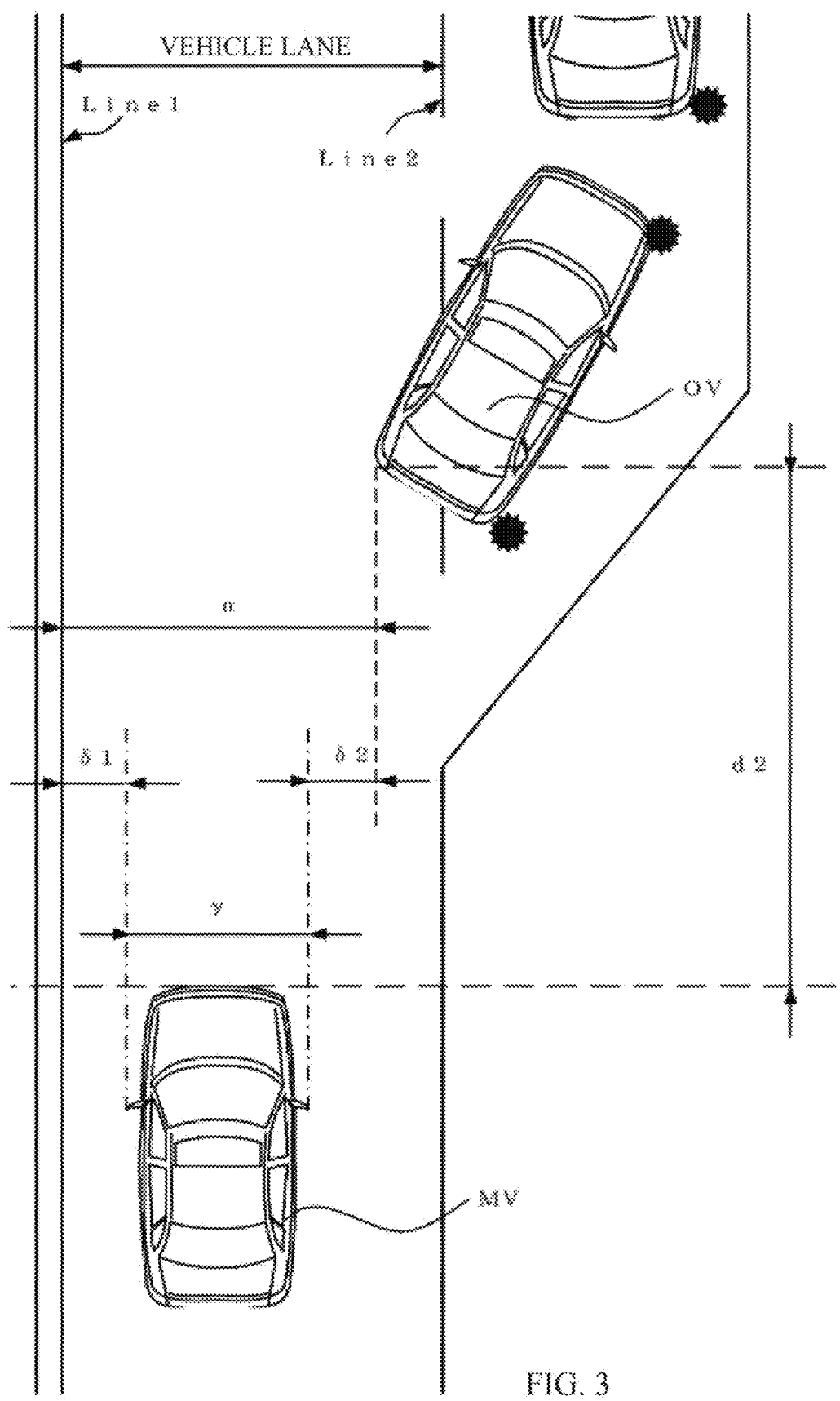
FIG. 3 is a diagram illustrating data to be detected by the obstacle detection unit of the travel control apparatus according to the first embodiment of the disclosure.

When obstacles are detected only on one side of the vehicle lane, as illustrated in FIG. 3, the obstacle detection unit 10 may detect, as the travelable width α, a distance from a lane line Line1 to the obstacle OV. The lane line Line1 is a lane line located on side on which no obstacles are present, out of lane lines Line1 and Line2 that define the vehicle lane. In this case, the travelable width α is the width of the travelable region within the vehicle lane on which the vehicle MV travels, with one of both sides of the travelable region defined by the obstacle OV located on the vehicle lane on which the vehicle MV travels.

The obstacle detection unit 10 may further detect obstacle distances δ1 and δ2, based on the image data regarding the forward view ahead of the vehicle MV. The obstacle distances δ1 and δ2 are distances from the vehicle MV to the respective obstacles. The obstacle detection unit 10 may transmit a detection result to the travel control unit 40.

The obstacle detection unit 10 may further detect presence or absence of any adjacent vehicle lanes to the currently traveled vehicle lane, based on the image data regarding the forward view ahead of the vehicle MV. The obstacle detection unit 10 may transmit a detection result to the travel control unit 40 described later.

The passability determination unit 20 may determine whether or not the obstacle is avoidable within the vehicle lane on which the vehicle MV is currently traveling, based on the travelable width, a vehicle width of the vehicle MV, and a margin. For example, the travelable width may be the distance between both sideward obstacles located on the vehicle lane on which the vehicle MV travels. The margin is a distance from the vehicle MV to the obstacle when the vehicle passes by the obstacle.

In one example, the passability determination unit 20 may determine whether or not the road cones RC and the obstacle OV as the obstacles are avoidable within the vehicle lane on which the vehicle MV is currently traveling, based on the travelable width α, a vehicle width γ of the vehicle MV, and the margin β. The travelable width α is received from the obstacle detection unit 10. The vehicle width γ of the vehicle MV is held in an unillustrated memory. The margin β is the distance from the vehicle MV to the obstacle.

In one example, the passability determination unit 20 may compare a value of a sum of the vehicle width γ and two times the margin β (γ+β×2) with a value of the travelable width α, to determine whether or not the obstacles are avoidable within the vehicle lane on which the vehicle MV is currently traveling.

When the sum of the vehicle width γ and two times the margin β is smaller than the travelable width α (γ+β×2<α), the passability determination unit 20 may determine that the obstacles are avoidable within the vehicle lane on which the vehicle MV is currently traveling.

When the sum of the vehicle width γ and two times the margin β is greater than the travelable width α (γ+β×2>α), the passability determination unit 20 may determine that the obstacles are unavoidable within the vehicle lane on which the vehicle MV is currently traveling.

Here, a value of the margin β may be determined based on the travel speed of the vehicle MV.

Moreover, the passability determination unit 20 may determine the value of the margin β based on the current travel speed of the vehicle MV, in view of knowledge that the sense of fear to be evoked in an occupant varies depending on the travel speed of the vehicle MV when passing by an obstacle. Thus, the passability determination unit 20 may determine whether or not the obstacles are avoidable within the vehicle lane on which the vehicle MV travels.

Here, the value of the margin β may be determined based on the current travel speed of the vehicle MV, with the use of, for example, a conversion table of the travel speed and the margin β held in an unillustrated memory.

The conversion table mentioned above may be created based on a result of checking, for each travel speed, the distance from the vehicle MV to the obstacle that is long enough not to evoke the sense of fear in an occupant.

The passability determination unit 20 may transmit, to the travel control unit 40 described later, a determination result as to whether or not the obstacles are avoidable within the vehicle lane on which the vehicle MV is currently traveling.

The surrounding vehicle detection unit 30 may detect surrounding vehicle data. The surrounding vehicle data may include data regarding positions and travel speeds of surrounding vehicles SV traveling on the vehicle lane on which the vehicle MV travels and an adjacent vehicle lane.

The surrounding vehicle detection unit 30 may include, for example, an image analyzing device. The surrounding vehicle detection unit 30 may detect the positions and the travel speeds of the surrounding vehicles SV by performing image analysis of image data regarding a 360° view around the vehicle MV.

Figure 4:
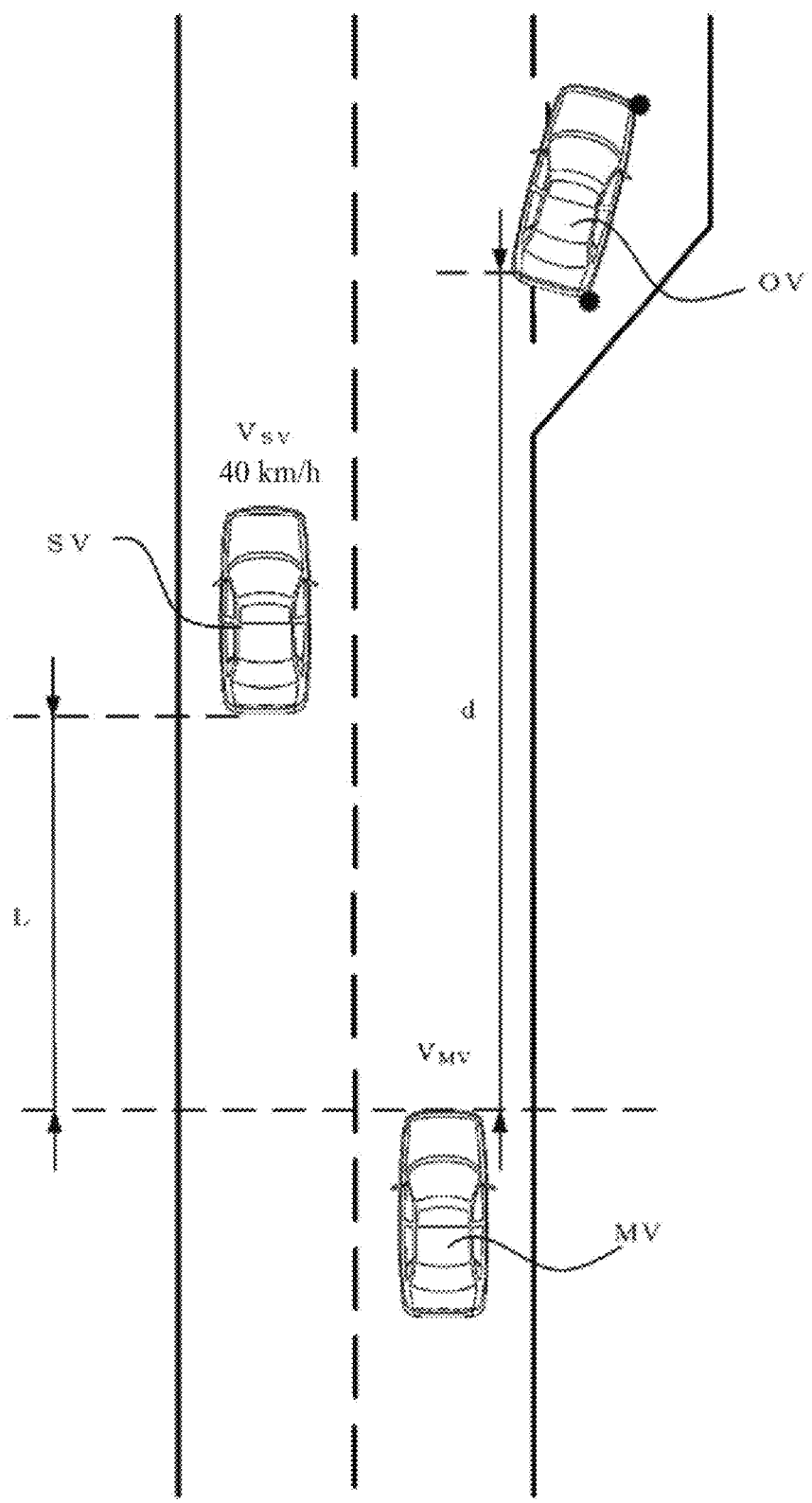
FIG. 4 is a diagram illustrating data to be detected by a surrounding vehicle detection unit of the travel control apparatus according to the first embodiment of the disclosure.

In one example, as illustrated in FIG. 4, when detecting the surrounding vehicle SV traveling on the adjacent vehicle lane to the vehicle lane on which the vehicle MV travels, the surrounding vehicle detection unit 30 may detect a distance L from the vehicle MV to the surrounding vehicle SV and a travel speed $V_{SV}$ of the surrounding vehicle SV The travel speed $V_{SV}$ of the surrounding vehicle SV may be, for example, 40 km/h.

It is to be noted that the surrounding vehicle detection unit 30 may include, for example, LIDAR or millimeter-wave radar, to acquire the surrounding vehicle data.

The surrounding vehicle detection unit 30 may transmit the detected surrounding vehicle data to the travel control unit 40 described below.

The travel control unit 40 may carry out a travel control to allow the vehicle MV to travel while avoiding the obstacle OV, based on the obstacle-reaching distance detected by the obstacle detection unit 10, the determination result by the passability determination unit 20, and the surrounding vehicle data detected by the surrounding vehicle detection unit 30.

In one example, when the passability determination unit 20 determines that the obstacle OV is avoidable within the vehicle lane on which the vehicle MV is currently traveling, the travel control unit 40 controls the travel speed of the vehicle MV to keep the vehicle MV, the surrounding vehicle SV, and the obstacle OV from becoming side by side when the vehicle MV passes by the obstacle OV.

Moreover, when the passability determination unit 20 determines that the obstacle OV is unavoidable within the vehicle lane on which the vehicle MV is currently traveling, the travel control unit 40 may determine, based on the surrounding vehicle data, whether or not any one of the surrounding vehicles SV is approaching from behind at a higher travel speed than the travel speed of the vehicle MV.

When the travel control unit 40 determines that any one of the surrounding vehicles SV is approaching from behind at the higher travel speed than the travel speed of the vehicle MV, the travel control unit 40 may carry out a speed control to raise the travel speed of the vehicle MV to allow a difference in the travel speed between the vehicle MV and the relevant one of the surrounding vehicles SV to become equal to or smaller than a predetermined value, and afterwards, carry out the travel control to allow the vehicle MV to travel while avoiding the obstacle OV.

With any one of the surrounding vehicles SV approaching at the higher travel speed than the travel speed of the vehicle MV, allowing the vehicle MV to enter the adjacent vehicle lane may cause the relevant one of the surrounding vehicles SV to suddenly approach the vehicle MV This may possibly evoke the sense of fear in the driver.

Thus, when the vehicle MV enters the adjacent vehicle lane to avoid the obstacle OV, the travel control unit 40 may determine whether or not any one of the surrounding vehicles SV is approaching from behind on the vehicle lane the vehicle MV is going to enter, at the higher travel speed than the vehicle MV.

Moreover, when the travel control unit 40 determines that any one of the surrounding vehicles SV is approaching at the higher travel speed than the travel speed of the vehicle MV, the travel control unit 40 may carry out a control to raise the travel speed of the vehicle MV. After the travel control unit 40 confirms that the difference in the travel speed between the vehicle MV and the relevant one of the surrounding vehicles SV becomes equal to or smaller than the predetermined value, the travel control unit 40 may carry out the travel control to allow the vehicle MV to travel while avoiding the obstacle OV.

The travel control to be carried out by the travel control unit 40 to avoid the obstacle OV may include, at least, a timing control to light and distinguish a turn signal lamp, a steering assistance control, and a speed control, without limitation.

Furthermore, when the travel control unit 40 carries out the speed control to raise the travel speed of the vehicle MV described above, the travel control unit 40 may determine whether or not the adjacent vehicle lane for the vehicle MV to avoid the obstacle OV is enterable, based on the obstacle-reaching distance d and the surrounding vehicle data. The surrounding vehicle data includes the distance L from the vehicle MV to the surrounding vehicle SV and the travel speed $V_{SV}$ of the surrounding vehicle SV. When the travel control unit 40 determines that the adjacent vehicle lane is unenterable, the travel control unit 40 may carry out a control to stop the vehicle MV. The travel control unit 40 may let the surrounding vehicle SV pass by, and afterwards, carry out the travel control to allow the vehicle MV to travel while avoiding the obstacle OV.

<Processing by Travel Control Unit 40>

Processing by the travel control unit 40 is described with reference to FIGS. 5 to 10.

<Processing when Vehicle MV Avoids Obstacle OV within Vehicle Lane on which Vehicle MV is Traveling>

Figure 5:
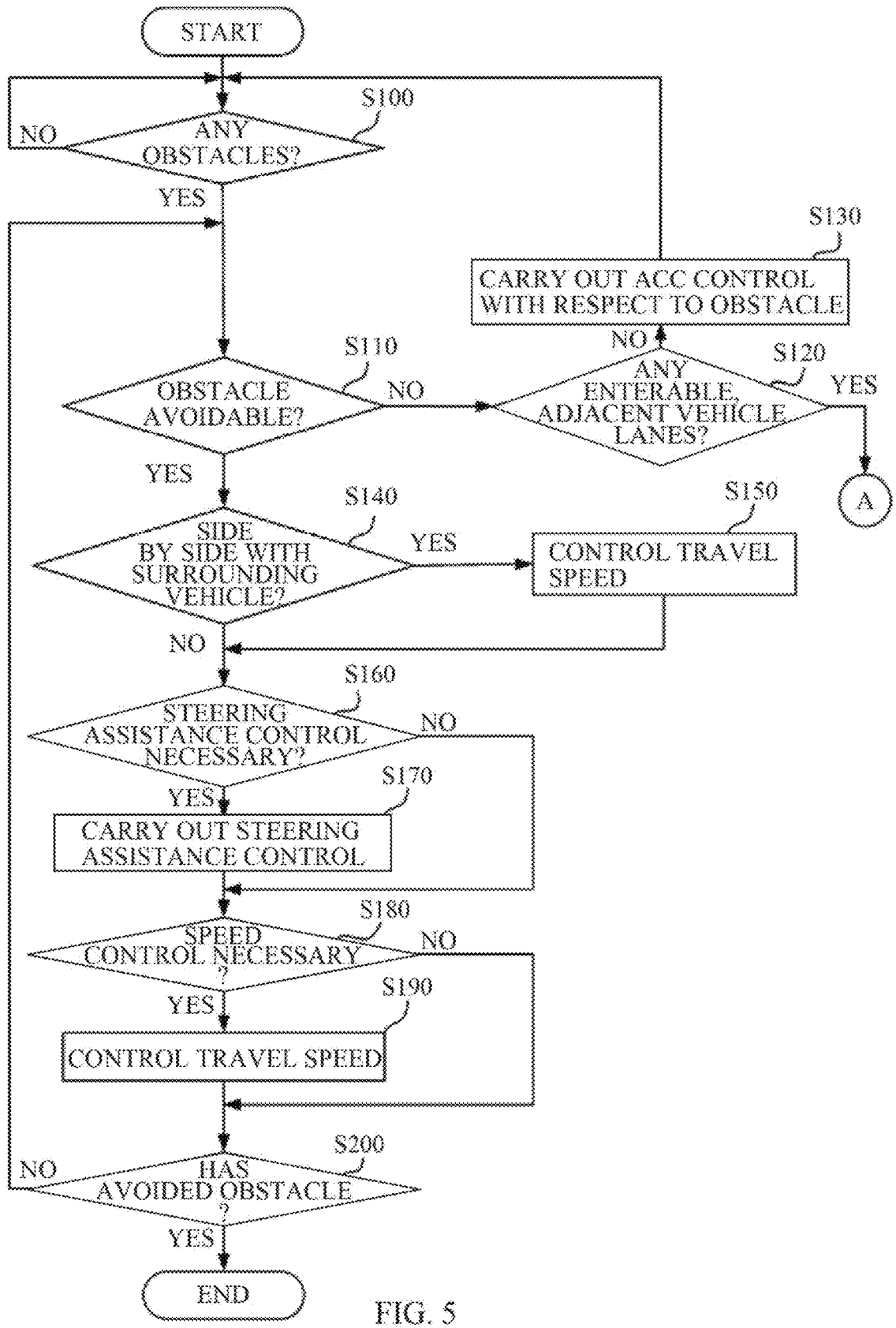
FIG. 5 is a flowchart of processing by the travel control apparatus according to the first embodiment of the disclosure.

Description is given, with reference to FIG. 5, of the processing by the travel control unit 40 when the vehicle MV avoids the obstacle OV within the vehicle lane on which the vehicle MV is currently traveling.

The travel control unit 40 may determine whether or not any obstacles OV have been detected on the vehicle lane on which the vehicle MV travels, based on the detection result received from the obstacle detection unit 10 (step S100).

When the travel control unit 40 determines that an obstacle OV has been detected on the vehicle lane on which the vehicle MV is traveling ("YES" in step S100), the travel control unit 40 may cause the flow to proceed to step S110.

When the travel control unit 40 determines that no obstacle OV has been detected on the vehicle lane on which the vehicle MV is traveling ("NO" in step S100), the travel control unit 40 may cause the flow to return to step S100 and shift to a standby state.

When the travel control unit 40 determines that an obstacle OV has been detected on the vehicle lane on which the vehicle MV travels ("YES" in step S100), the travel control unit 40 may determine whether or not the detected obstacle OV is avoidable within the vehicle lane on which the vehicle MV is currently traveling (step S110).

In one example, the travel control unit 40 may check the determination result received from the passability determination unit 20, and determine whether or not the obstacle OV is avoidable within the vehicle lane on which the vehicle MV is currently traveling.

When the travel control unit 40 determines that the detected obstacle OV is avoidable within the vehicle lane on which the vehicle MV is currently traveling ("YES" in step S110), the travel control unit 40 may cause the flow to proceed to step S140.

When the travel control unit 40 determines that the detected obstacle OV is unavoidable within the currently traveled vehicle lane ("NO" in step S110), the travel control unit 40 may cause the flow to proceed to step S120.

When the travel control unit 40 determines that the detected obstacle OV is unavoidable within the currently traveled vehicle lane ("NO" in step S110), the travel control unit 40 may determine presence or absence of any adjacent vehicle lane that is enterable for the vehicle MV to avoid the obstacle OV (step S120).

In one example, the travel control unit 40 may determine the presence or the absence of any adjacent vehicle lane that is enterable for the vehicle MV to avoid the obstacle OV, based on the detection result received from the obstacle detection unit 10.

Figure 9:
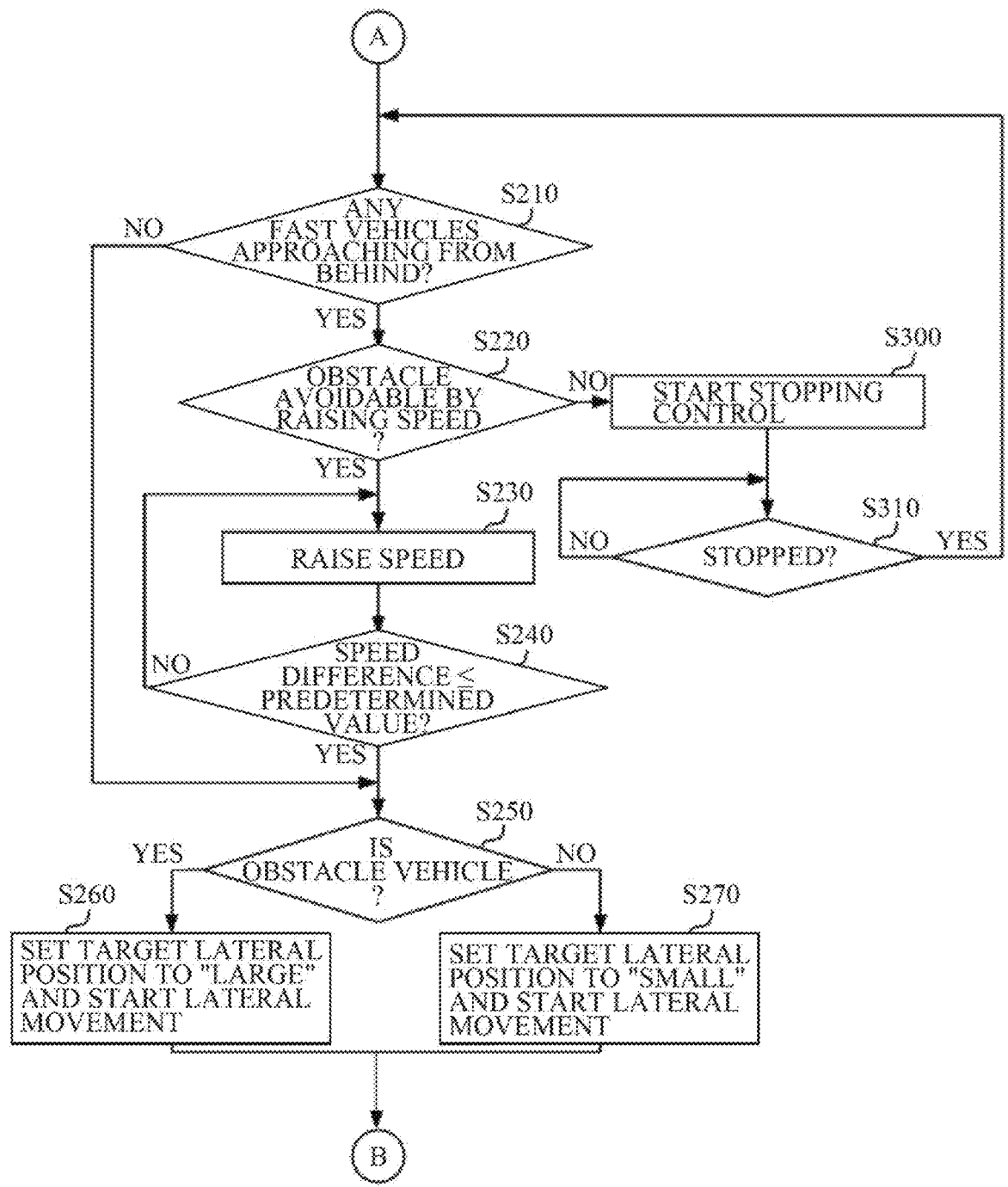
FIG. 9 is a flowchart of processing by the travel control apparatus according to the first embodiment of the disclosure.

When the travel control unit 40 determines the presence of an adjacent vehicle lane that is enterable for the vehicle MV to avoid the obstacle OV ("YES" in step S120), the travel control unit 40 may cause the flow to proceed to step S210 illustrated in FIG. 9.

When the travel control unit 40 determines the absence of an adjacent vehicle lane that is enterable for the vehicle MV to avoid the obstacle OV ("NO" in step S120), the travel control unit 40 may cause the flow to proceed to step S130.

A processing flow when the vehicle MV enters the adjacent vehicle lane to avoid the obstacle OV is described later.

When the travel control unit 40 determines the absence of an adjacent vehicle lane that is enterable for the vehicle MV to avoid the obstacle OV ("NO" in step S120), the travel control unit 40 may carry out an adaptive cruise control (ACC) of the vehicle MV (step S130), and cause the flow to return to step S100 and continue.

When there is no vehicle lane that is enterable for the vehicle MV to avoid the obstacle OV, the travel control unit 40 may control the travel speed of the vehicle MV to control the distance from the vehicle MV to the obstacle OV, to prevent the vehicle MV from coming into contact with the obstacle OV.

When carrying out the speed control of the vehicle MV by the ACC control, the travel control unit 40 may give an alarm sound and provide alarm display to an occupant, and thereafter, start the speed control.

After starting the ACC control, the travel control unit 40 may cause the flow to return to step S100, and continuously check the detection result of the obstacle OV (step S100) and the determination result as to whether or not the obstacle OV is avoidable within the same vehicle lane (step S110). One reason is that, for example, a vehicle as the obstacle OV waiting for a right turn sometimes completely enters a right-turn lane after starting the ACC control of the vehicle MV When the travel control unit 40 determines that the obstacle OV is avoidable within the same vehicle lane ("YES" in step S110), the travel control unit 40 may determine whether or not the vehicle MV, the surrounding vehicle SV, and the obstacle OV become side by side when the vehicle MV passes by the obstacle OV (step S140).

When the travel control unit 40 determines that the vehicle MV does not become side by side with the surrounding vehicle SV when passing by the obstacle OV ("NO" in step S140), the travel control unit 40 may cause the flow to proceed to step S160.

When the travel control unit 40 determines that the vehicle MV, the surrounding vehicle SV, and the obstacle OV become side by side when the vehicle MV passes by the obstacle OV ("YES" in step S140), the travel control unit 40 may control the speed of the vehicle MV (step S150) and cause the flow to proceed to step S160.

When carrying out the speed control of the vehicle MV, the travel control unit 40 may give an alarm sound and provide alarm display to the occupant, and thereafter, start the speed control.

Figure 6:
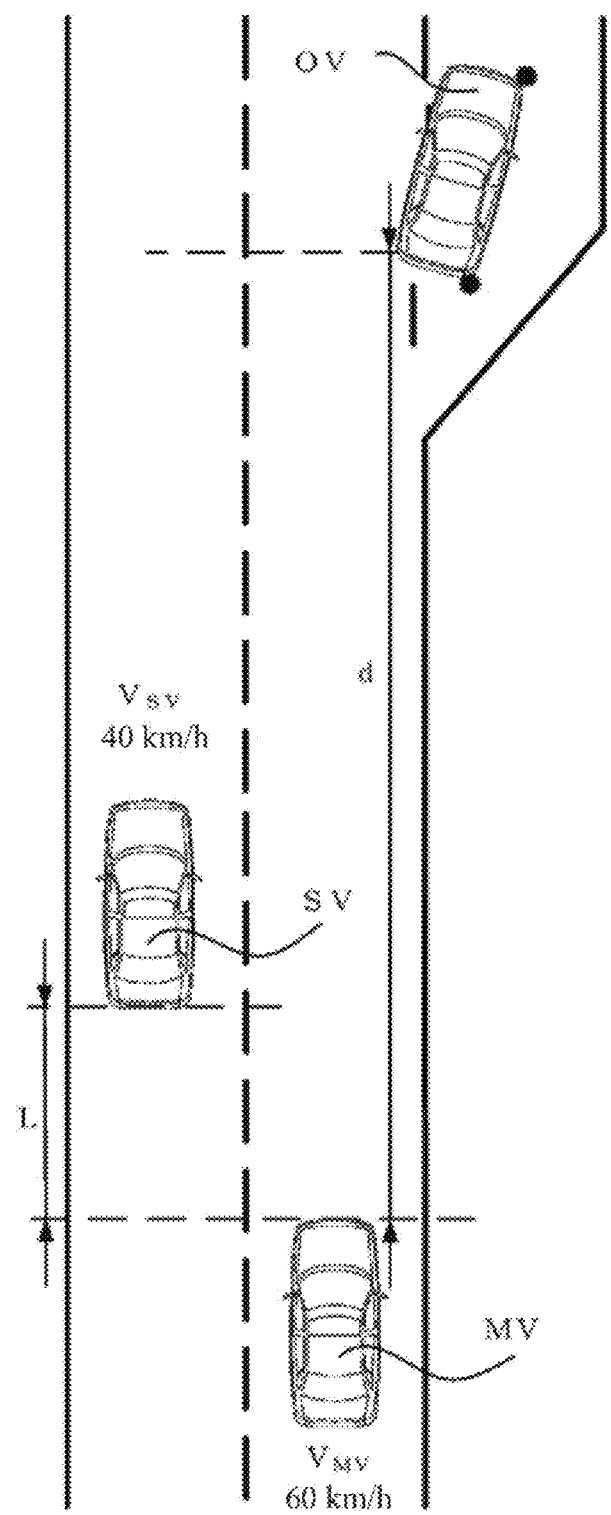
FIG. 6 schematically illustrates speed control processing to be carried out by a travel control unit of the travel control apparatus according to the first embodiment of the disclosure.
Figure 7:
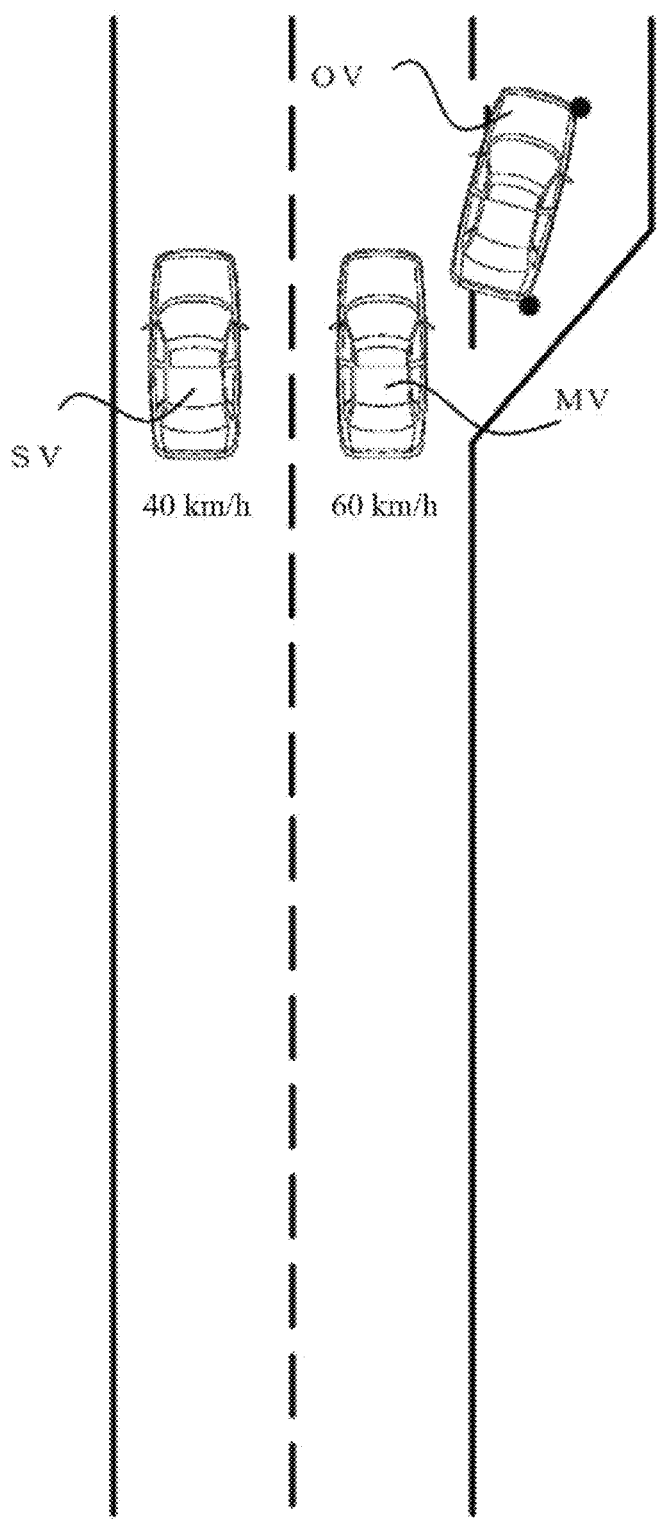
FIG. 7 schematically illustrates the speed control processing to be carried out by the travel control unit of the travel control apparatus according to the first embodiment of the disclosure.
Figure 8:
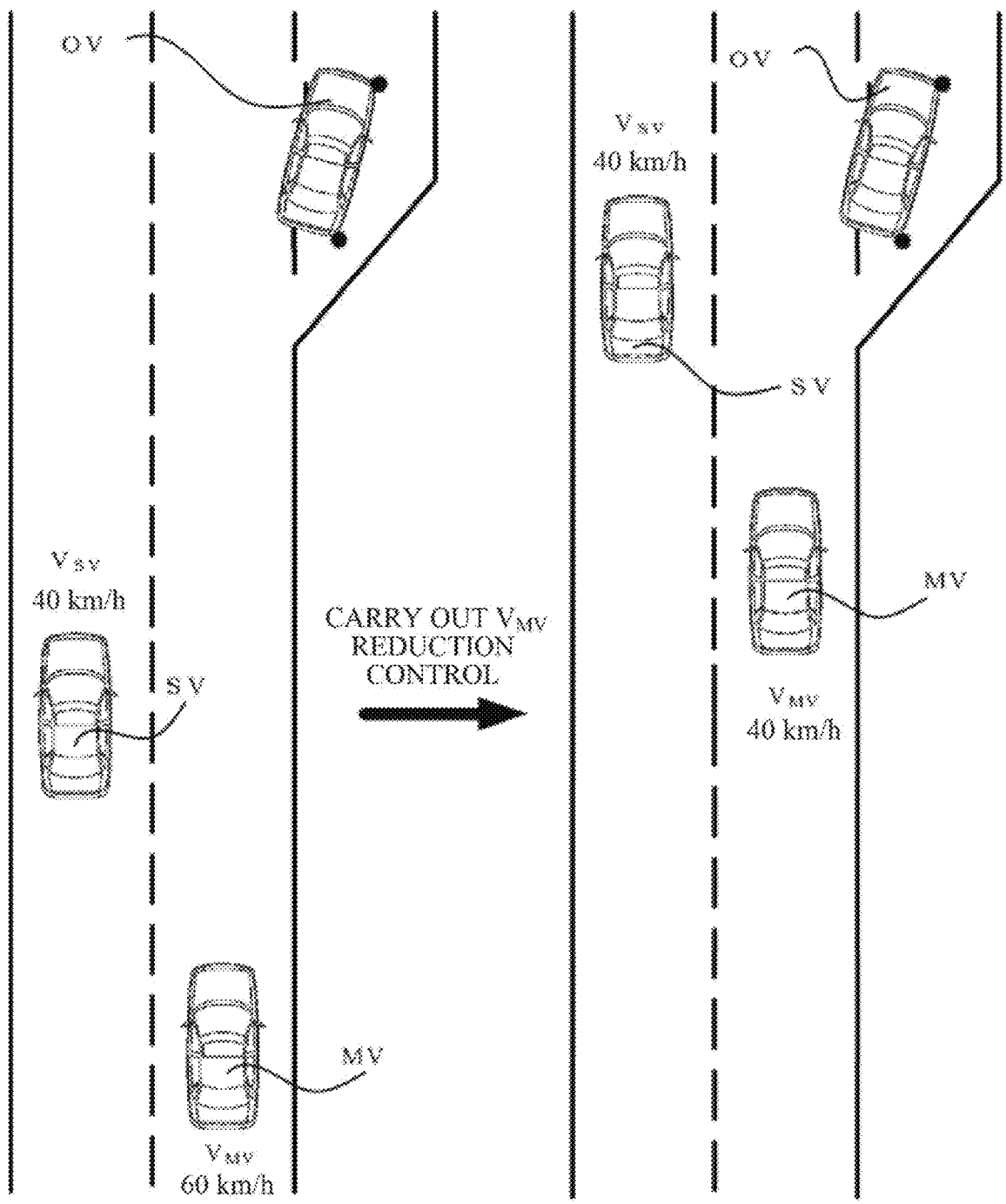
FIG. 8 schematically illustrates the speed control processing to be carried out by the travel control unit of the travel control apparatus according to the first embodiment of the disclosure.

With reference to FIGS. 6 to 8, description is given of how the travel control unit 40 determines whether or not the vehicle MV, the surrounding vehicle SV, and the obstacle OV become side by side when the vehicle MV passes by the obstacle OV.

When the obstacle OV is detected on the vehicle lane on which the vehicle MV travels by the obstacle detection unit 10, the travel control unit 40 may check whether or not the vehicle MV becomes side by side with the surrounding vehicle SV at timing when the vehicle MV avoids the obstacle OV if the vehicle MV continues traveling while keeping the current travel speed, based on the obstacle-reaching distance d, the surrounding vehicle data, and the travel speed $V_{MV}$ of the vehicle MV The obstacle-reaching distance d is detected by the obstacle detection unit 10. The surrounding vehicle data is detected by the surrounding vehicle detection unit 30 and includes, for example, the distance L from the vehicle MV to the surrounding vehicle SV and the travel speed $V_{SV}$ of the surrounding vehicle SV.

For example, as illustrated in FIG. 6, let us assume a case where the surrounding vehicle SV is traveling ahead at 40 km/h on the adjacent vehicle lane to the vehicle lane on which the vehicle MV travels, while the vehicle MV continues traveling at the speed of 60 km. In this case, the travel control unit 40 may determine whether or not the vehicle MV, the obstacle OV, and the surrounding vehicle SV become side by side, as illustrated in FIG. 7.

In one example, the travel control unit 40 may calculate time TMV until the vehicle MV reaches the obstacle OV, and time TSV until the surrounding vehicle SV reaches the obstacle OV. When a time difference $\Delta T$ between the time TMV and the time TSV is equal to or smaller than a predetermined value, the travel control unit 40 may determine that the vehicle MV, the obstacle OV, and the surrounding vehicle SV travel side by side.

When the time difference $\Delta T$ is equal to or greater than the predetermined value, the travel control unit 40 may determine that the vehicle MV, the obstacle OV, and the surrounding vehicle SV do not become side by side.

When the travel control unit 40 determines that the vehicle MV, the obstacle OV, and the surrounding vehicle SV become side by side, the travel control unit 40 may control the travel speed $V_{MV}$ of the vehicle MV to allow the time difference $\Delta T$ to become equal to or greater than the predetermined value.

In one example, as illustrated in FIG. 8, when the travel control unit 40 determines that the vehicle MV, the obstacle OV, and the surrounding vehicle SV become side by side, the travel control unit 40 may make a control to reduce the travel speed $V_{MV}$ of the vehicle MV, for example, from 60 km/h to 40 km/h to allow the time difference $\Delta T$ to become equal to or greater than the predetermined value. Thus, the travel control unit 40 prevents the vehicle MV, the obstacle OV, and the surrounding vehicle SV from traveling side by side.

When the travel control unit 40 determines that the vehicle MV, the surrounding vehicle SV, and the obstacle OV do not become side by side when the vehicle MV passes by the obstacle OV ("NO" in step S140), or when the process of step S150 is finished, the travel control unit 40 may determine whether or not the steering assistance control of the vehicle MV is necessary (step S160).

In one example, the travel control unit 40 may determine whether or not the steering assistance control is necessary, based on an actual distance from the vehicle MV to the obstacle OV, i.e., the obstacle distances δ1 and δ2 illustrated in FIG. 3, received from the obstacle detection unit 10.

For example, the travel control unit 40 may determine that the steering assistance control is necessary when a difference between the obstacle distances δ1 and δ2 is equal to or greater than a predetermined value.

When the travel control unit 40 determines that the steering assistance control of the vehicle MV is necessary ("YES" in step S160), the travel control unit 40 may carry out the steering assistance control of the vehicle MV (step S170), and cause the flow to proceed to step S180.

When the travel control unit 40 determines that the steering assistance control of the vehicle MV is not necessary ("NO" in step S160), the travel control unit 40 may cause the flow to proceed to step S180.

The travel control unit 40 may determine whether or not the speed control of the vehicle MV is necessary (step S180).

For example, the travel control unit 40 may determine whether or not the speed control is necessary by comparing the margin β based on the current travel speed of the vehicle MV with the actual obstacle distances δ1 and δ2 from the vehicle MV to the obstacle OV, until the vehicle MV avoids the obstacle OV, in consideration of an increase in the speed of the vehicle MV and a movement of the obstacle OV depending on the driver's operation and road conditions such as presence of any slopes.

In one example, when (δ1+δ2)/2<β, in which β denotes the margin, the travel control unit 40 may determine that the speed control of the vehicle MV is necessary.

That is, the travel control unit 40 may determine that the control to reduce the travel speed of the vehicle MV is necessary when the travel control unit 40 determines that passing by and avoiding the obstacle OV at the current travel speed would evoke the sense of fear in the occupant.

The travel control unit 40 may refer to a conversion table of the travel speed and the margin β, determine the travel speed based on a value of (δ1+δ2)/2, and carry out the speed control to bring the travel speed of the vehicle MV to the determined travel speed.

When the travel control unit 40 determines that the speed control of the vehicle MV is necessary ("YES" in step S180), the travel control unit 40 may carry out the control to reduce the speed of the vehicle MV (step S190), and cause the flow to proceed to step S200.

When carrying out the speed control of the vehicle MV, the travel control unit 40 may give an alarm sound and provide alarm display to the occupant, and thereafter, start the speed control.

When the travel control unit 40 determines that the speed control of the vehicle MV is not necessary ("NO" in step S180), the travel control unit 40 may cause the flow to proceed to step S200.

The travel control unit 40 may determine whether or not the vehicle MV has avoided the obstacle OV (step S200).

The travel control unit 40 may check the detection result received from the obstacle detection unit 10 and determine whether or not the vehicle MV has avoided the obstacle OV.

When the travel control unit 40 determines that the vehicle MV has not avoided the obstacle OV ("NO" in step S200), the travel control unit 40 may cause the flow to return to step S110 and continue.

When the travel control unit 40 determines that the vehicle MV has avoided the obstacle OV ("YES" in step S200), the travel control unit 40 may end the processing.

<Processing when Vehicle MV Enters Adjacent Vehicle Lane and Avoids Obstacle OV>

With reference to FIG. 9, processing is described in which the vehicle MV enters the adjacent vehicle lane to the currently traveled vehicle lane and avoids the obstacle OV.

When the travel control unit 40 determines the presence of an adjacent vehicle lane that is enterable for the vehicle MV to avoid the obstacle OV ("YES" in step S120 in FIG. 5), the travel control unit 40 may cause the flow to proceed to step S210.

The travel control unit 40 may determine, based on the surrounding vehicle data received from the surrounding vehicle detection unit 30, whether or not any one of the surrounding vehicles SV is approaching the vehicle MV from behind at a higher travel speed than the travel speed of the vehicle MV on the vehicle lane the vehicle MV is going to enter to avoid the obstacle OV (step S210).

When the travel control unit 40 determines that no surrounding vehicles SV are approaching the vehicle MV from behind ("NO" in step S210), the travel control unit 40 may cause the flow to proceed to step S250.

When the travel control unit 40 determines that any one of the surrounding vehicles SV is approaching the vehicle MV from behind ("YES" in step S210), the travel control unit 40 may cause the flow to proceed to step S220.

When the travel control unit 40 determines that any one of the surrounding vehicles SV is approaching the vehicle MV from behind ("YES" in step S210), the travel control unit 40 may determine whether or not the obstacle OV is avoidable by carrying out the control to raise the travel speed of the vehicle MV (step S220).

In the following, description is given as to how the travel control unit 40 determines whether or not the obstacle OV is avoidable by carrying out the control to raise the travel speed of the vehicle MV.

Before starting the speed control to raise the travel speed of the vehicle MV, the travel control unit 40 may calculate acceleration time and avoidance time. The acceleration time is time it takes for the difference in the travel speed between the vehicle MV and the surrounding vehicle SV to become equal to or smaller than the predetermined value. The avoidance time is time it takes to move the vehicle MV to a position where the obstacle OV is avoidable.

In one example, the acceleration time may be calculated based on, for example, a predetermined acceleration rate, and the difference in the travel speed between the vehicle MV and the surrounding vehicle SV. The predetermined acceleration rate is a speed change that does not make the occupant anxious.

The avoidance time may be calculated by summing up: time until a start of a course change while lighting the turn signal lamp; and time calculated based on a predetermined lateral movement speed and a distance of a lateral movement from the current vehicle position to a position where the vehicle MV avoids the obstacle OV. The predetermined lateral movement speed is a speed of the course change that does not make the occupant anxious.

The travel control unit 40 may calculate an expected travel distance, based on the acceleration time, the avoidance time, and the current travel speed of the vehicle MV. The expected travel distance is a distance to be traveled by the vehicle MV during total time of the acceleration time and the avoidance time. The travel control unit 40 may compare the calculation result with the obstacle-reaching distance d.

At this occasion, when the expected travel distance is longer than the obstacle-reaching distance, the travel control unit 40 may determine that the obstacle OV is unavoidable because the vehicle MV would reach the obstacle OV before an end of the control of raising the travel speed of the vehicle MV to avoid the obstacle OV.

When the travel control unit 40 determines that the obstacle OV is unavoidable by carrying out the control to raise the travel speed of the vehicle MV ("NO" in step S220), the travel control unit 40 may cause the flow to proceed to step S300.

When the travel control unit 40 determines that the obstacle OV is avoidable by carrying out the control to raise the travel speed of the vehicle MV ("YES" in step S220), the travel control unit 40 may carry out the control to raise the travel speed of the vehicle MV (step S230), and cause the flow to proceed to step S240.

When the travel control unit 40 determines that the obstacle OV is unavoidable by carrying out the control of raising the travel speed of the vehicle MV ("NO" in step S220), the travel control unit 40 may start a control to stop the vehicle MV within the currently traveled vehicle lane (step S300), and cause the flow to proceed to step S310.

That is, when the travel control unit 40 determines that the obstacle OV is unavoidable by raising the travel speed of the vehicle MV and cutting in front of the vehicle approaching from behind, the travel control unit 40 may carry out a control to temporarily stop the vehicle MV within the currently traveled vehicle lane.

The travel control unit 40 may control the travel speed of the vehicle MV and the distance from the vehicle MV to the obstacle OV, to keep the vehicle MV from coming into contact with the obstacle OV ahead, and carry out the control to stop the vehicle MV.

The travel control unit 40 may determine whether or not the vehicle MV has stopped (step S310).

In one example, the travel control unit 40 may acquire the travel speed of the vehicle MV and determine whether or not the vehicle MV has stopped.

When the travel control unit 40 determines that the vehicle MV has not stopped ("NO" in step S310), the travel control unit 40 may cause the flow to return to step S310 and shift to the standby state.

When the travel control unit 40 determines that the vehicle MV has stopped ("YES" in step S310), the travel control unit 40 cause the flow to return to step S210 and continue.

That is, after confirming that the vehicle MV has temporarily stopped, the travel control unit 40 may determine again, in step S210, presence or absence of any vehicles approaching the vehicle MV from behind. Thus, the travel control unit 40 may cause the flow to continue.

The travel control unit 40 may determine whether or not the difference in the travel speed between the vehicle MV and the surrounding vehicle SV approaching the vehicle MV from behind has become equal to or smaller than the predetermined value (step S240).

When the travel control unit 40 determines that the difference in the travel speed between the vehicle MV and the surrounding vehicle SV approaching the vehicle MV from behind has become equal to or smaller than the predetermined value ("YES" in step S240), the travel control unit 40 may cause the flow to proceed to step S250.

When the travel control unit 40 determines that the difference in the travel speed between the vehicle MV and the surrounding vehicle SV approaching the vehicle MV from behind has not become equal to or smaller than the predetermined value ("NO" in step S240), the travel control unit 40 may cause the flow to return to step S230 and continue.

That is, the travel control unit 40 may carry out the control to raise the travel speed of the vehicle MV (step S230) until the difference in the travel speed between the vehicle MV and the surrounding vehicle SV approaching the vehicle MV from behind becomes equal to or smaller than the predetermined value.

It is to be noted that there may occur a case where, while raising the travel speed of the vehicle MV until the difference in the travel speed between the vehicle MV and the surrounding vehicle SV becomes equal to or smaller than the predetermined value, some vehicle cuts in front of the vehicle MV, or a preceding vehicle on the same vehicle lane suddenly decelerates. In such a case, the travel control unit 40 may shift to a collision avoidance control and start a control to decelerate the vehicle MV.

When the travel control unit 40 determines that no surrounding vehicles SV are approaching the vehicle MV from behind at the higher travel speed than the speed of the vehicle MV ("NO" in step S210), or when the travel control unit 40 determines that the difference in the travel speed between the vehicle MV and the surrounding vehicle SV approaching the vehicle MV from behind has become equal to or smaller than the predetermined value ("YES" in step S240), the travel control unit 40 may determine whether or not the obstacle OV to be avoided by the vehicle MV is a vehicle (step S250).

In one example, the travel control unit 40 may determine whether or not the obstacle OV to be avoided by the vehicle MV is a vehicle, based on the data from the obstacle detection unit 10.

When the travel control unit 40 determines that the obstacle OV to be avoided by the vehicle MV is a vehicle ("YES" in step S250), the travel control unit 40 may set a target lateral position to "large" and start a travel control to allow the vehicle MV to enter the adjacent vehicle lane (step S260). The target lateral position is a distance from the vehicle MV to the obstacle OV when the vehicle MV passes by the obstacle OV. Thereafter, the travel control unit 40 may cause the flow to proceed to step S400 in FIG. 10.

When the travel control unit 40 determines that the obstacle OV to be avoided by the vehicle MV is not a vehicle ("NO" in step S250), the travel control unit 40 may set the target lateral position to "small" and start the travel control to allow the vehicle MV to enter the adjacent vehicle lane (step S270). The target lateral position is the distance from the vehicle MV to the obstacle OV when the vehicle MV passes by the obstacle OV.

When the vehicle MV enters the adjacent vehicle lane to avoid the obstacle OV, the travel control unit 40 may change the target lateral position depending on whether or not the obstacle OV is a vehicle. The target lateral position is a target distance from the vehicle MV to the obstacle OV.

That is, when the obstacle OV is a vehicle, there is possibility that, for example, the vehicle may move suddenly, or a door of the vehicle may open suddenly.

Accordingly, the travel control unit 40 may set the target lateral position at a distance large enough to avoid collision by, for example, the collision avoidance control even if a sudden change in the obstacle OV occurs.

It is to be noted that when the obstacle OV is other than a vehicle, the target lateral position may be set at a shorter distance than when the obstacle OV is a vehicle. The distance may be set to a distance that does not evoke the sense of fear in the occupant when the vehicle MV passes by the obstacle OV.

<Travel Control Processing to Allow Vehicle MV to Enter Adjacent Vehicle Lane>

Figure 10:
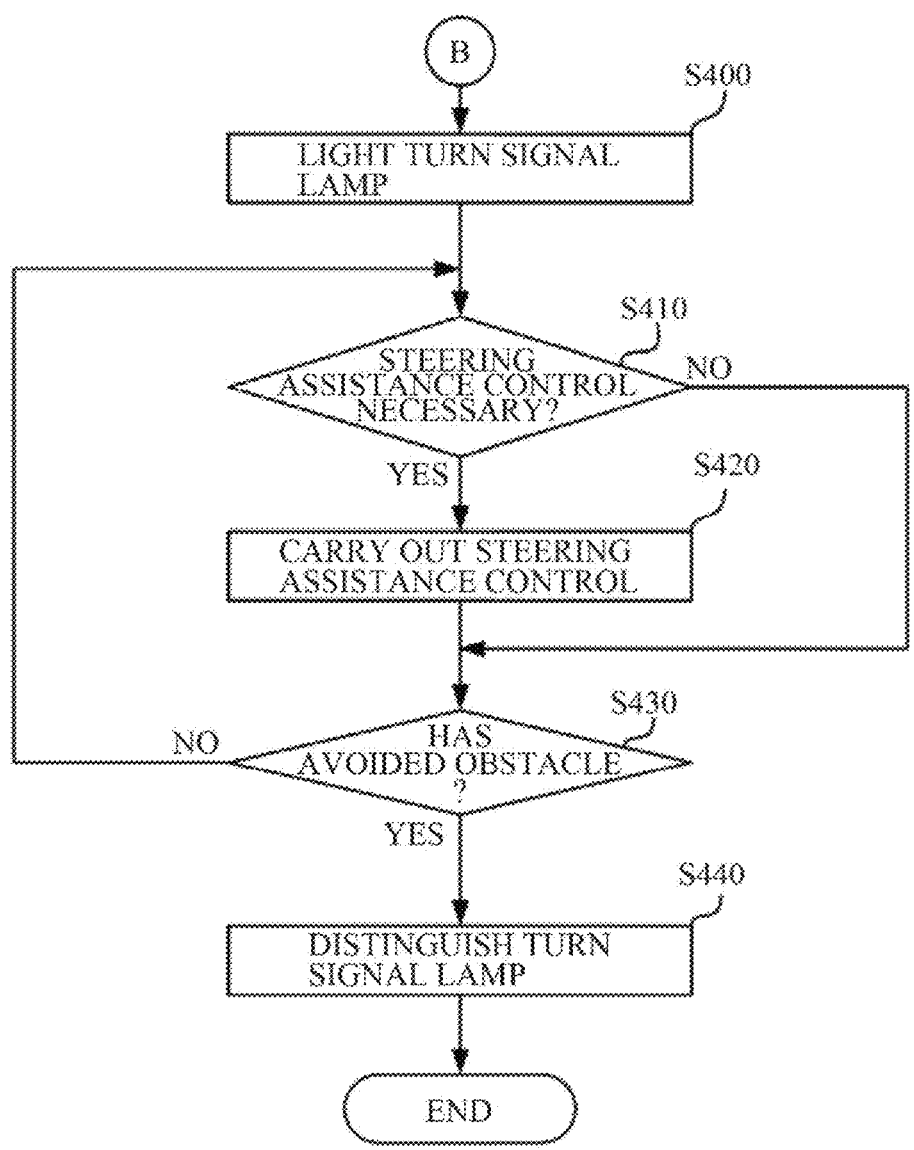
FIG. 10 is a flowchart of the processing by the travel control apparatus according to the first embodiment of the disclosure.

Description is given, with reference to FIG. 10, of travel control processing to allow the vehicle MV to enter the adjacent vehicle lane.

Upon starting the travel control to allow the vehicle MV to enter the adjacent vehicle lane, the travel control unit 40 may light the turn signal lamp on side on which the vehicle lane the vehicle MV is going to enter to avoid the obstacle OV is disposed (step S400).

The travel control unit 40 may check the target lateral position set in step S260 or S270 and the position of the vehicle MV, and determine whether or not the steering assistance control is necessary (step S410).

When the travel control unit 40 determines that the steering assistance control is necessary ("YES" in step S410), the travel control unit 40 may carry out the steering assistance control (step S420), and cause the flow to proceed to step S430.

In one example, the travel control unit 40 may carry out the steering assistance control to make the detection result by the obstacle detection unit 10, i.e., the obstacle distance 62, larger than the distance set as the target lateral position.

When the travel control unit 40 determines that the steering assist control is not necessary ("NO" in step S410), the travel control unit 40 may cause the flow to proceed to step S430.

The travel control unit 40 may determine whether or not the vehicle MV has avoided the obstacle OV (step S430).

The travel control unit 40 may determine whether or not the vehicle MV has avoided the obstacle OV, based on the detection result by the obstacle detection unit 10.

When the travel control unit 40 determines that the vehicle MV has avoided the obstacle OV ("YES" in step S430), the travel control unit 40 may cause the flow to proceed to step S440.

When the travel control unit 40 determines that the vehicle MV has not avoided the obstacle OV ("NO" in step S430), the travel control unit 40 may cause the flow to return to step S410 and continue.

When the travel control unit 40 determines that the vehicle MV has avoided the obstacle OV ("YES" in step S430), the travel control unit 40 may carry out a control to distinguish the turn signal lamp (step S440), and end the processing.

<Workings and Effects>

As described, the travel control apparatus 1 according to this embodiment may include the obstacle detection unit 10, the passability determination unit 20, the surrounding vehicle detection unit 30, and the travel control unit 40. The obstacle detection unit 10 is configured to detect the travelable width $\alpha$ and the obstacle-reaching distance d. For example, the travelable width $\alpha$ may be the distance between both sideward obstacles OV located on the vehicle lane on which the vehicle MV travels. The obstacle-reaching distance d is the distance from the vehicle MV to the obstacle OV. The passability determination unit 20 is configured to determine whether or not the obstacle OV is avoidable within the vehicle lane on which the vehicle MV is currently traveling, based on the travelable width $\alpha$, the vehicle width $\gamma$ of the vehicle MV, and the margin $\beta$. The margin $\beta$ is the distance from the vehicle MV to the obstacle OV when the vehicle MV passes by the obstacle OV. The surrounding vehicle detection unit 30 is configured to detect the surrounding vehicle data. The surrounding vehicle data includes the data regarding the positions and the travel speeds of the surrounding vehicles SV traveling on the vehicle lane on which the vehicle MV travels and the adjacent vehicle lane. The travel control unit 40 is configured to carry out the travel control to allow the vehicle MV to travel while avoiding the obstacle OV, based on the determination result of the passability determination unit 20 and the surrounding vehicle data.

When the passability determination unit 20 determines that the obstacle OV is avoidable within the vehicle lane on which the vehicle MV is currently traveling, the travel control unit 40 is configured to control the travel speed of the vehicle MV to keep the vehicle MV, any one of the surrounding vehicles SV, and the obstacle OV from becoming side by side when the vehicle MV passes by the obstacle OV.

That is, when determining whether or not the obstacle OV is avoidable within the vehicle lane on which the vehicle MV is currently traveling, the passability determination unit 20 is configured to make the determination based on the vehicle width $\gamma$ of the vehicle MV, the margin $\beta$, and the travelable width $\alpha$. The margin $\beta$ is the distance from the vehicle MV to the obstacle OV.

This provides a sufficient distance of the margin $\beta$ between the vehicle MV and the obstacle OV each time the vehicle MV passes by while avoiding the obstacle OV. Hence, it is possible to suppress the sense of fear to be evoked in the occupant when the vehicle MV passes by while avoiding the obstacle OV located on the vehicle lane on which the vehicle MV travels.

Moreover, the value of the margin $\beta$ may be determined based on the travel speed of the vehicle MV.

That is, the sense of fear to be evoked in the occupant may vary with the travel speed of the vehicle MV when the vehicle MV passes by the obstacle OV. Accordingly, the passability determination unit 20 may determine the value of the margin $\beta$ in conjunction with the travel speed of the vehicle MV, and determine whether or not the obstacle OV is avoidable within the vehicle lane on which the vehicle MV travels.

Accordingly, when the travel speed of the vehicle MV is high, it is possible to pass by the obstacle, with the greater margin $\beta$ provided. Hence, it is possible to suppress the sense of fear to be evoked in the occupant of the vehicle when the vehicle MV passes by while avoiding the obstacle OV.

Furthermore, the description of the travel control apparatus 1 according to the forgoing first embodiment is given with reference to the figures that assume left-side traffic. However, even in the case of right-side traffic, it is possible to suppress the sense of fear to be evoked in the occupant of the vehicle when the vehicle MV passes by while avoiding the obstacle OV, by performing the control described above, with the left and right settings appropriately set in an opposite manner.

When the obstacle detection unit 10 detects the obstacle OV, the travel control unit 40 is configured to check whether or not the vehicle MV becomes side by side with the surrounding vehicle SV at the timing when the vehicle MV avoids the obstacle OV on the condition that the vehicle MV continues traveling while maintaining the current travel speed, based on the obstacle-reaching distance d, the surrounding vehicle data, and the travel speed of the vehicle MV. The surrounding vehicle data includes the positions and the travel speeds of the surrounding vehicles SV.

That is, when the vehicle MV passes by while avoiding the obstacle OV, traveling while being flanked by the obstacle OV and the surrounding vehicle SV may possibly evoke the sense of fear in the driver.

Thus, the travel control unit 40 is configured to control the travel speed $V_{MV}$ of the vehicle MV to keep the vehicle MV, the obstacle OV, and the surrounding vehicle SV from becoming side by side.

As a result, when the vehicle MV passes by while avoiding the obstacle OV, the vehicle MV, the obstacle OV, and the surrounding vehicle SV do not become side by side. Hence, it is possible to suppress the sense of fear to be evoked in the occupant of the vehicle when the vehicle MV passes by while avoiding the obstacle OV.

Moreover, when avoiding the obstacle OV, the travel control unit 40 may carry out the steering assistance control based on the current position of the vehicle MV and the position of the obstacle OV, to provide the sufficient margin $\beta$.

Thus, when the vehicle MV passes by while avoiding the obstacle OV, the distance of the margin $\beta$ is provided between the vehicle MV and the obstacle OV. Hence, it is possible to suppress the sense of fear to be evoked in the occupant of the vehicle when the vehicle MV passes by while avoiding the obstacle OV located on the vehicle lane on which the vehicle MV travels.

Furthermore, the travel control unit 40 may determine whether or not the control to reduce the travel speed of the vehicle MV is necessary, based on the current distance from the obstacle OV to the vehicle MV and the current travel speed $V_{MV}$ of the vehicle MV.

In other words, when the travel speed of the vehicle MV increases because of, for example, the driver's operation, it is difficult to provide the sufficient margin $\beta$. This may possibly evoke the sense of fear in the occupant. Accordingly, the travel control unit 40 may carry out the control to reduce the travel speed of the vehicle MV.

Thus, when the vehicle MV passes by while avoiding the obstacle OV, the travel speed of the vehicle MV is controlled to the travel speed that is interlocked with the current distance from the obstacle OV and the vehicle MV. Hence, it is possible to suppress the sense of fear to be evoked in the occupant of the vehicle when the vehicle MV passes by while avoiding the obstacle OV.

In addition, in the travel control apparatus 1 according to this embodiment, when the passability determination unit 20 determines that the obstacle OV is unavoidable within the vehicle lane on which the vehicle MV is currently traveling, the travel control unit 40 may determine, based on the surrounding vehicle data, whether or not any one of the surrounding vehicles SV is approaching from behind at the higher travel speed than the travel speed of the vehicle MV. When the travel control unit 40 determines that any one of the surrounding vehicles SV is approaching from behind at the higher travel speed than the travel speed of the vehicle MV, the travel control unit 40 may carry out the speed control to raise the travel speed of the vehicle MV to allow the difference in the travel speed between the vehicle MV and the relevant one of the surrounding vehicles SV to be equal to or smaller than the predetermined value. Afterwards, the travel control unit 40 may carry out the travel control to allow the vehicle MV to travel while avoiding the obstacle OV.

That is, in the situation where any one of the surrounding vehicles SV is traveling while approaching at the higher travel speed than the vehicle MV, allowing the vehicle MV to enter the adjacent vehicle lane may cause the relevant one of the surrounding vehicles SV to suddenly approach the vehicle MV. This may possibly evoke the sense of fear in the occupants of the vehicle MV and the relevant one of the surrounding vehicles SV.

Accordingly, when the vehicle MV avoids the obstacle OV, the travel control unit 40 may determine whether or not any one of the surrounding vehicles SV is approaching from behind at the higher travel speed than the vehicle MV on the vehicle lane the vehicle MV is going to enter to avoid the obstacle OV.

In other words, when the travel control unit 40 determines that any one of the surrounding vehicles SV is approaching at the higher travel speed than the travel speed of the vehicle MV, the travel control unit 40 may carry out the control to raise the travel speed of the vehicle MV. After confirming that the difference in the travel speed between the vehicle MV and the relevant one of the surrounding vehicles SV has become equal to or smaller than the predetermined value, the travel control unit 40 may carry out the travel control to allow the vehicle MV to enter the adjacent vehicle lane.

This makes it possible to prevent the relevant one of the surrounding vehicles SV from suddenly approaching the vehicle MV when the vehicle MV enters the adjacent vehicle lane to avoid the obstacle OV. Hence, it is possible to suppress the sense of fear to be evoked in the occupant.

Moreover, in the travel control apparatus 1 according to this embodiment, when carrying out the speed control to raise the travel speed of the vehicle MV, the travel control unit 40 may determine whether or not the vehicle lane for the vehicle MV to avoid the obstacle OV is enterable, based on the obstacle-reaching distance d and the surrounding vehicle data. When the travel control unit 40 determines that the vehicle lane is unenterable, the travel control unit 40 may carry out the control to stop the vehicle MV. The travel control unit 40 may let the relevant one of the surrounding vehicles SV pass by, and afterwards, carry out the travel control to allow the vehicle MV to travel while avoiding the obstacle OV.

In one example, before starting the speed control to raise the travel speed of the vehicle MV, the travel control unit 40 may calculate the acceleration time and the avoidance time. The acceleration time is the time it takes for the difference in the travel speed between the vehicle MV and the surrounding vehicles SV to become equal to or smaller than the predetermined value. The avoidance time is the time it takes to move the vehicle MV to the position where the obstacle OV is avoidable.

Based on the acceleration time, the avoidance time, and the current travel speed of the vehicle MV, the travel control unit 40 may calculate the expected travel distance. The expected travel distance is the distance to be traveled by the vehicle MV during the total time of the acceleration time and the avoidance time. The travel control unit 40 may compare the calculation result with the obstacle-reaching distance d.

When the expected travel distance is longer than the obstacle-reaching distance, the travel control unit 40 may determine that the obstacle OV is unavoidable because the vehicle MV reaches the obstacle OV before the end of the control to raise the travel speed to avoid the obstacle OV.

That is, the travel control unit 40 may determine whether or not the obstacle OV is avoidable by raising the travel speed of the vehicle MV. When the travel control unit 40 determines that the obstacle OV is unavoidable, the travel control unit 40 may stop the vehicle MV temporarily on the currently traveled vehicle lane. After letting the surrounding vehicle SV pass by, the travel control unit 40 may carry out the travel control to allow the vehicle MV to travel while avoiding the obstacle OV.

This prevents the vehicle MV from making a risky entry to the vehicle lane to avoid the obstacle OV, leading to suppression of the sense of fear to be evoked in the occupant.

Second Embodiment

With reference to FIGS. 11 to 16, described is a travel control apparatus 1A according to a second embodiment of the disclosure.

The constituent elements denoted by the same reference numerals as in the first embodiment have the same configurations and workings, and detailed description thereof is omitted.

<Configuration of Travel Control Apparatus 1A>

Figure 11:
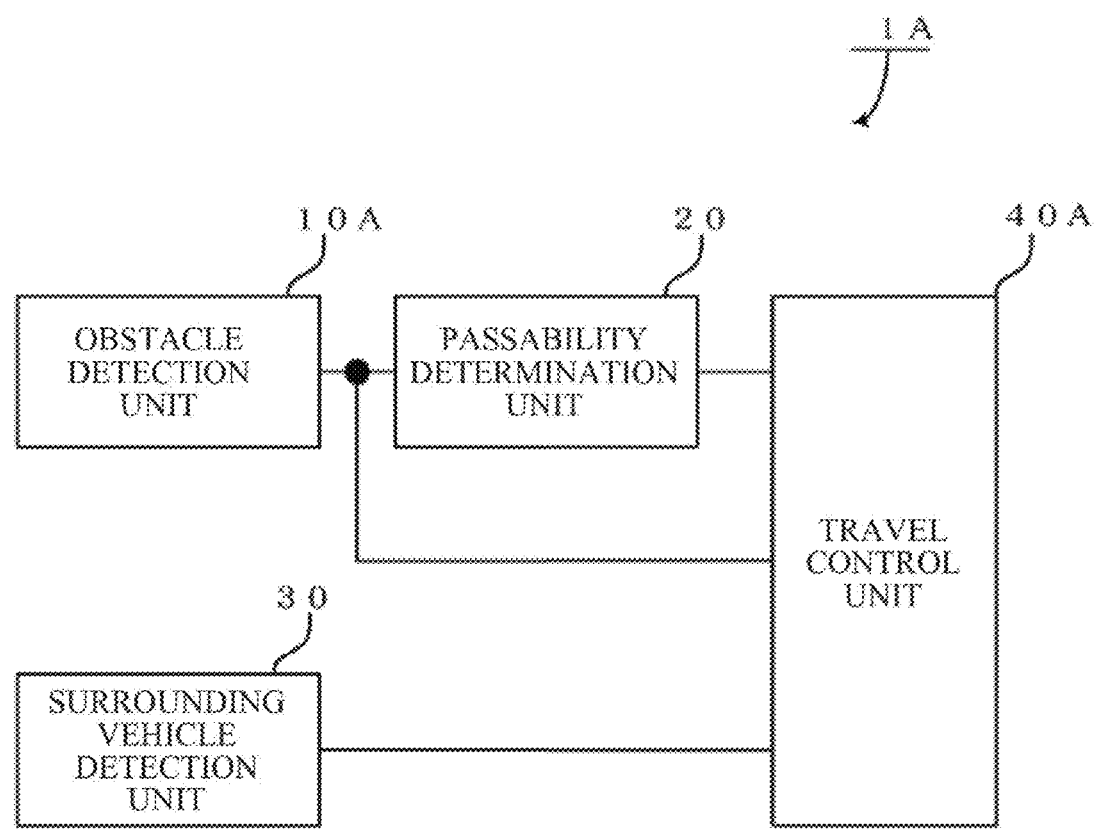
FIG. 11 is a block diagram of a configuration of a travel control apparatus according to a second embodiment of the disclosure.

As illustrated in FIG. 11, the travel control apparatus 1A according to this embodiment may include, for example, an obstacle detection unit 10A, the passability determination unit 20, the surrounding vehicle detection unit 30, and a travel control unit 40A.

The obstacle detection unit 10A may further detect a length of each of both sideward obstacles OV located on the vehicle lane on which the vehicle MV travels.

Figure 12:
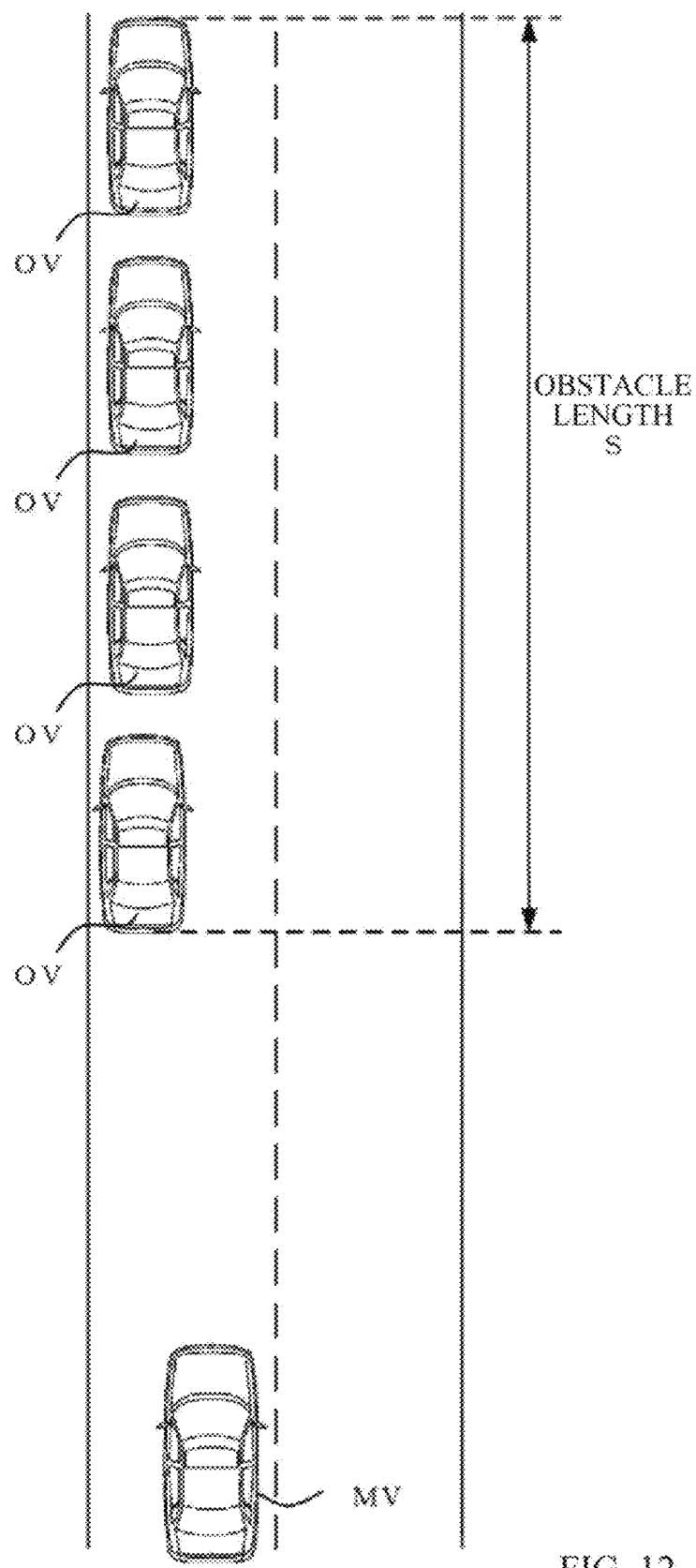
FIG. 12 is a diagram illustrating data to be detected by an obstacle detection unit of the travel control apparatus according to the second embodiment of the disclosure.

In one example, as illustrated in FIG. 12, for example, when detecting four parked vehicles as the obstacles OV, the obstacle detection unit 10A may detect an obstacle length S, that is, a length of an entirety of the obstacles.

The obstacle detection unit 10A may transmit a value of the detected obstacle length S to the travel control unit 40A.

When the passability determination unit 20 determines that the obstacle OV is unavoidable within the vehicle lane on which the vehicle MV is currently traveling, the travel control unit 40A may calculate obstacle-passing time, based on the obstacle length S and the travel speed of the vehicle MV The obstacle-passing time is time it takes to pass by the entirety of the obstacles, i.e., the four parked vehicles.

When allowing the vehicle MV to enter the adjacent vehicle lane to avoid the obstacle OV, the travel control unit 40A may check the obstacle-passing time. When the obstacle-passing time is longer than predetermined time, the travel control unit 40A may carry out a travel control to allow the vehicle MV to travel at a position away from the obstacle by the margin β.

When the obstacle-passing time is shorter than the predetermined time, the travel control unit 40A may carry out the travel control to allow the vehicle MV to travel within the vehicle lane the vehicle MV is going to enter.

Here, the predetermined time to be compared with the obstacle-passing time described above may take a value of, for example, 3 seconds.

According to the Japanese Road Traffic Law, when allowing the vehicle MV to start lateral movement to make a course change, it is required to light the turn signal lamp on the side on which the vehicle lane the vehicle MV is going to enter is disposed, 3 seconds or more prior to the start of the lateral movement.

That is, after lighting the turn signal lamp, it is necessary to travel on the currently traveled vehicle lane for at least 3 seconds without making the course change.

Moreover, when the vehicle MV passes by the obstacle OV while avoiding the obstacle OV, the vehicle MV may sometimes travel while protruding from the vehicle lane, depending on the margin β set by the vehicle control.

Figure 13:
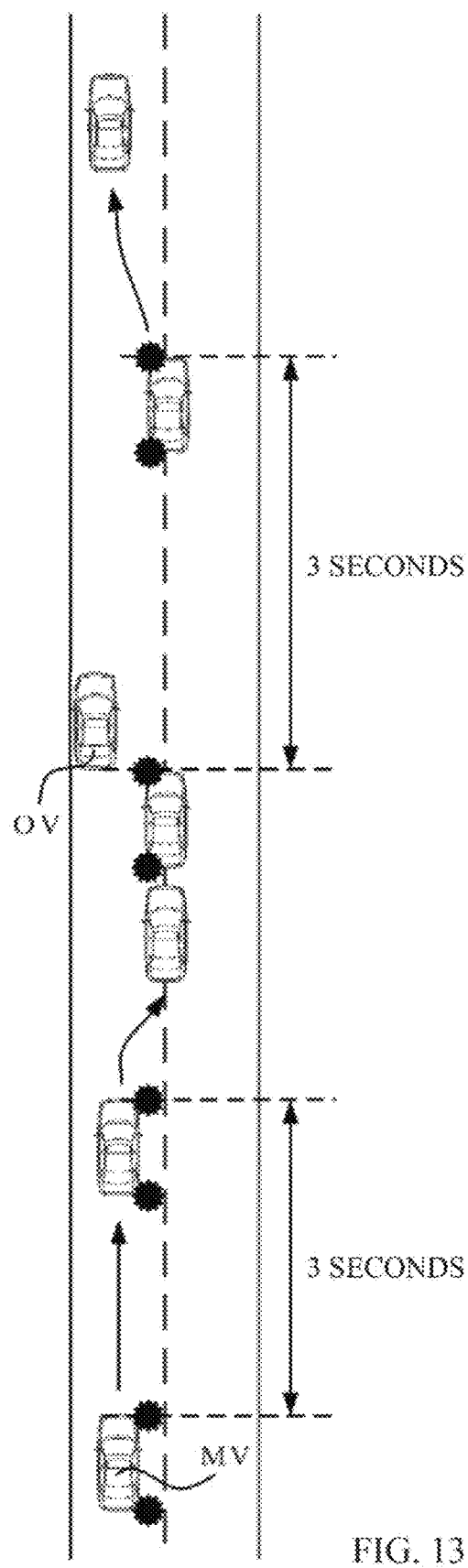
FIG. 13 schematically illustrates course change processing of a vehicle to be carried out by a travel control unit of the travel control apparatus according to the second embodiment of the disclosure.

However, when the vehicle travels while protruding from the vehicle lane, as illustrated in FIG. 13, the vehicle has to travel while protruding from the vehicle lane for at least 3 seconds even after passing by the obstacle OV. This may give an impression that the vehicle MV is a runaway vehicle, to the driver of the surrounding vehicle SV.

Figure 14:
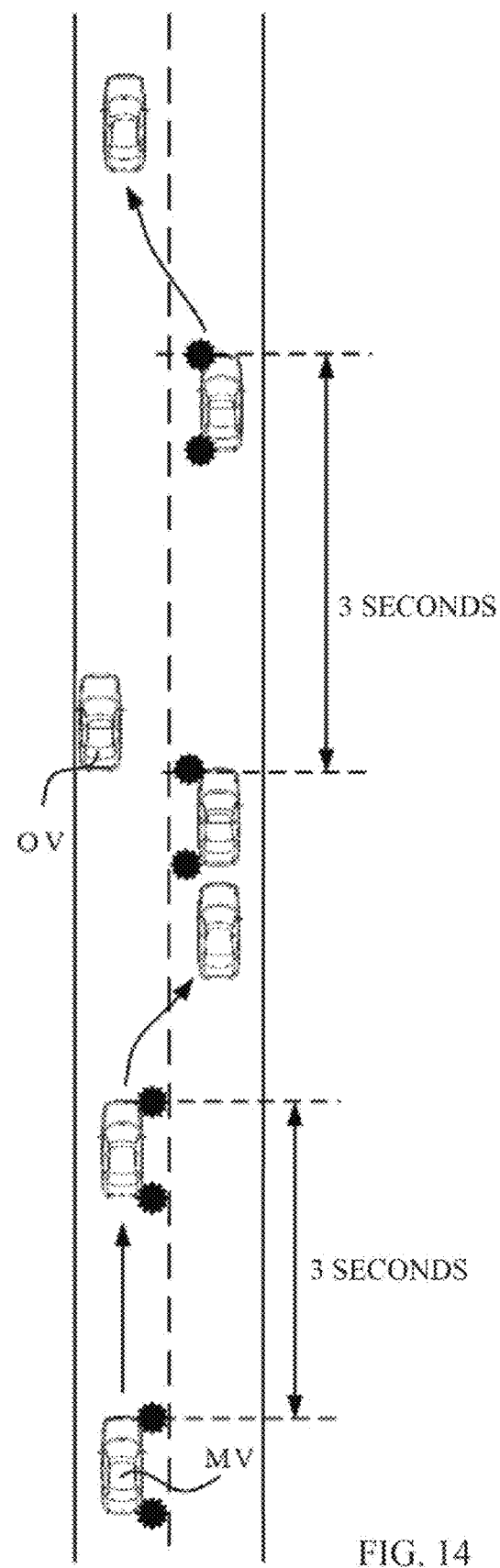
FIG. 14 schematically illustrates the course change processing of the vehicle to be carried out by the travel control unit of the travel control apparatus according to the second embodiment of the disclosure.

Accordingly, when the obstacle-passing time is 3 seconds or less, as illustrated in FIG. 14, the travel control unit 40A may carry out the travel control to move the vehicle MV into the vehicle lane the vehicle MV is going to enter, avoid the obstacle OV, and thereafter, carry out the travel control to return to the previously traveled vehicle lane.

Figure 15:
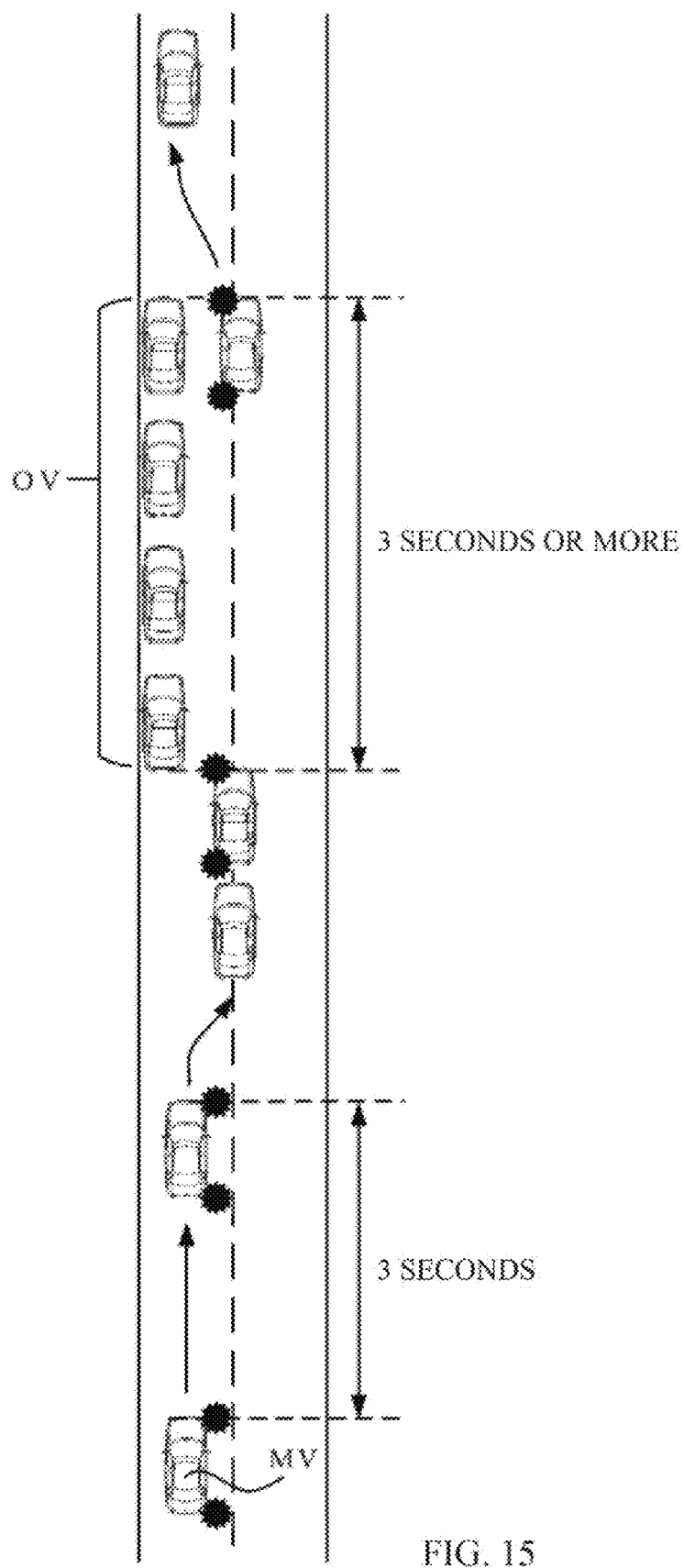
FIG. 15 schematically illustrates the course change processing of the vehicle to be carried out by the travel control unit of the travel control apparatus according to the second embodiment of the disclosure.

When the obstacle-passing time is 3 seconds or more, as illustrated in FIG. 15, the travel control unit 40A may carry out the travel control to allow the vehicle MV to travel over the currently traveled vehicle lane and the vehicle lane the vehicle MV is going to enter, avoid the obstacle OV, and thereafter, carry out the travel control to return the vehicle MV to the previously traveled vehicle lane.

The travel control to be carried out by the travel control unit 40A may include at least, for example, the timing control to light and distinguish the turn signal lamp, the steering assist control to move the vehicle MV to a predetermined travel position, and the speed control.

<Processing by Travel Control Unit 40A>

Figure 16:
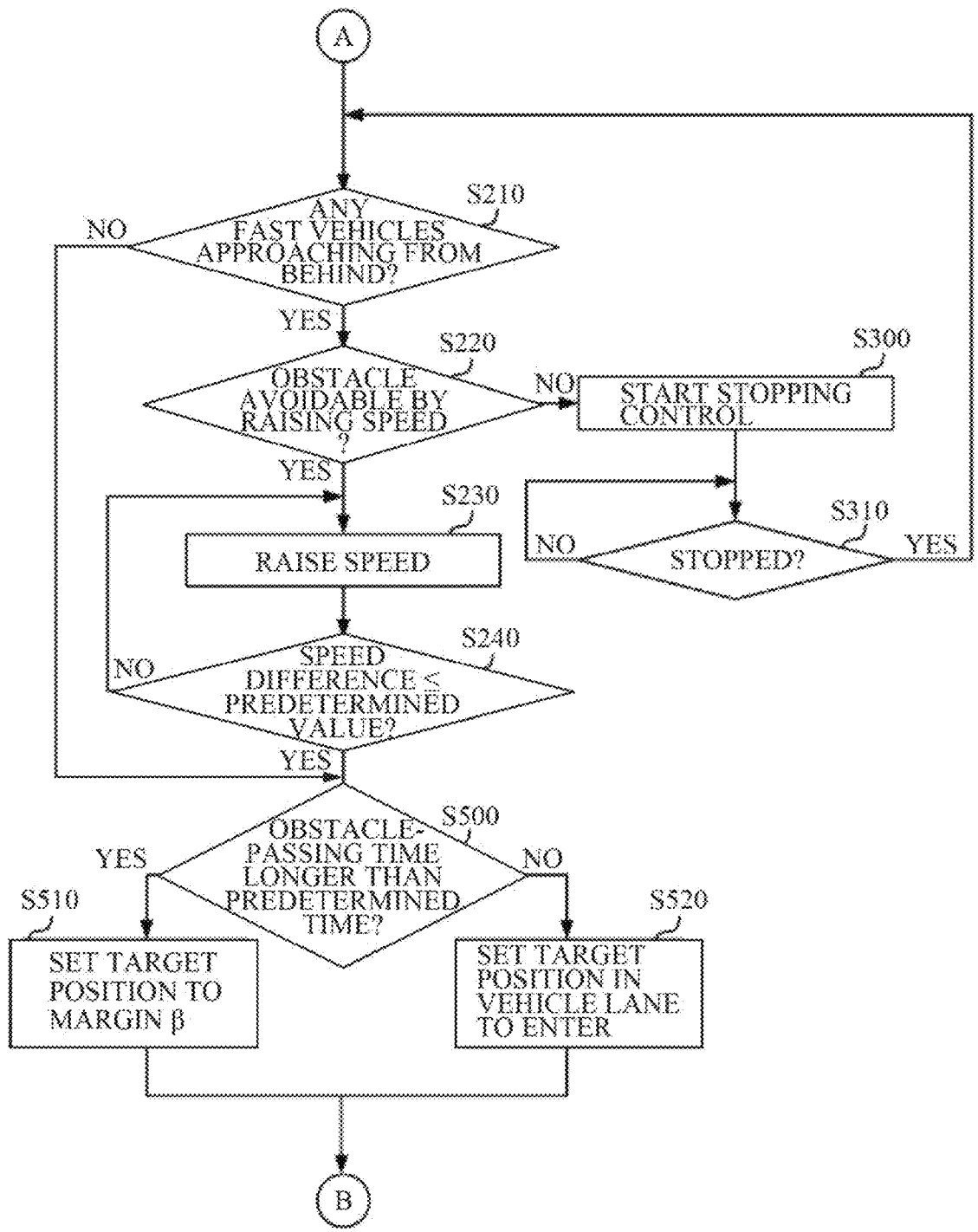
FIG. 16 is a flowchart of processing by the travel control apparatus according to the second embodiment of the disclosure.

With reference to FIG. 16, processing by the travel control unit 40A is described.

A difference between the processing by the travel control unit 40A and the processing by the travel control unit 40 lies in the processing of allowing the vehicle MV to enter the adjacent vehicle lane to the currently traveled vehicle lane to avoid the obstacle OV.

FIG. 16 illustrates a processing flow by the travel control unit 40A when the vehicle MV enters the adjacent vehicle lane to the currently traveled vehicle lane to avoid the obstacle OV Description is given below of only the differences from the flowchart of the processing by the travel control unit 40 in FIG. 9.

When the travel control unit 40A determines that the difference in the travel speed between the vehicle MV and the surrounding vehicle SV is equal to or smaller than the predetermined value ("YES" in step S240), the travel control unit 40A may cause the flow to proceed to step S500.

The travel control unit 40A may determine whether or not the obstacle-passing time is longer than the predetermined time (step S500).

When the travel control unit 40A determines that the obstacle-passing time is longer than the predetermined time ("YES" in step S500), the travel control unit 40A may set the target lateral position to the margin β, start the travel control to avoid the obstacle OV (step S510), and cause the flow to proceed to step S400.

When the travel control unit 40A determines that the obstacle-passing time is shorter than the predetermined time ("NO" in step S500), the travel control unit 40A may set the target lateral position within the vehicle lane the vehicle MV is going to enter, start the travel control to avoid the obstacle OV (step S520), and cause the flow to proceed to step S400.

<Workings and Effects>

As described, the travel control apparatus 1A according to this embodiment may include the obstacle detection unit 10A, the passability determination unit 20, the surrounding vehicle detection unit 30, and the travel control unit 40A. The obstacle detection unit 10A is configured to detect the travelable width α, the obstacle-reaching distance d, and the obstacle length S. For example, the travelable width α may be the distance between both sideward obstacles located on the vehicle lane on which the vehicle MV travels. The obstacle-reaching distance d is the distance from the vehicle MV to the obstacle OV. The obstacle length S is the length of each of both sideward obstacles located on the vehicle lane on which the vehicle MV travels. The passability determination unit 20 is configured to determine whether or not the obstacle OV is avoidable within the vehicle lane on which the vehicle MV is currently traveling, based on the travelable width α, the vehicle width γ of the vehicle MV, and the margin β. The margin β is the distance from the vehicle MV to the obstacle OV when the vehicle MV passes by the obstacle OV. The surrounding vehicle detection unit 30 is configured to detect the surrounding vehicle data. The surrounding vehicle data includes the data regarding the positions and the travel speeds of the surrounding vehicles SV traveling on the vehicle lane on which the vehicle MV travels and the adjacent vehicle lane. The travel control unit 40A is configured to carry out the travel control to allow the vehicle MV to travel while avoiding the obstacle OV, based on the determination result by the passability determination unit 20 and the surrounding vehicle data.

When allowing the vehicle MV to enter the adjacent vehicle lane to avoid the obstacle OV, the travel control unit 40A may check the obstacle-passing time. When the obstacle-passing time is longer than the predetermined time, the travel control unit 40A may carry out the travel control to allow the vehicle MV to travel at the position away from the obstacle OV by the margin β.

When the obstacle-passing time is shorter than the predetermined time, the travel control unit 40A may carry out the travel control to allow the vehicle MV to travel within the vehicle lane the vehicle is going to enter.

That is, when allowing the vehicle MV to make the lateral movement to the adjacent vehicle lane to avoid the obstacle OV, the travel control unit 40A may control the position at which the vehicle MV travels when avoiding the obstacle OV, in accordance with the time it takes to pass by the obstacle OV.

Thus, when the obstacle-passing time is shorter than the predetermined time, the travel control unit 40A may carry out the travel control to move the vehicle MV into the vehicle lane the vehicle is going to enter, and avoid the obstacle OV.

Hence, it is possible to prevent the vehicle MV from giving a misleading impression that the vehicle MV is a runaway vehicle, to the surrounding vehicle SV.

It is also possible to provide at least the margin β between the vehicle MV and the obstacle OV when the vehicle MV passes by while avoiding the obstacle OV This leads to suppression of the sense of fear to be evoked in the occupant of the vehicle when the vehicle MV passes by while avoiding the obstacle OV.

Furthermore, the description of the travel control apparatus 1A according to the forgoing second embodiment is given with reference to the figures that assume left-side traffic. However, even in the case of right-side traffic, it is possible to suppress the sense of fear to be evoked in the occupant of the vehicle when the vehicle MV passes by while avoiding the obstacle OV, by performing the control described above, with the left and right settings appropriately set in an opposite manner.

Modification Examples

In the travel control apparatuses 1 and 1A described above, the obstacle detection units 10 and 10A may detect, for example, a category of the obstacle OV and a condition of the obstacle OV. Based on the detection result, the value of the margin β may be changed.

For example, when the obstacle OV is a vehicle, the obstacle detection units 10 and 10A may detect, for example, the presence or the absence of an occupant in the vehicle, a lighting state of the turn signal lamp. For example, when the presence of an occupant in the vehicle is detected, the value of the margin β may be set to a longer distance than the case where no occupant is present in the vehicle.

This leads to further suppression of the sense of fear and an unexpected incident when the vehicle MV avoids the obstacle OV.

In the forgoing embodiments, an example is given where the travel control apparatuses 1 and 1A include the obstacle detection units 10 and 10A, respectively, and the surrounding vehicle detection unit 30. However, in an alternative configuration, the image data regarding the 360° view around the vehicle MV and the measurement data by the LIDAR, the millimeter wave radar, etc. may be transferred to a server coupled to the vehicle MV. The server may carry out the processing to be carried out by the obstacle detection units 10 and 10A, and the surrounding vehicle detection unit 30.

This makes it possible to quickly process a large amount of data and accurately detect the states of the obstacle OV, the vehicle MV, and the surrounding vehicle SV.

Moreover, the obstacle detection units 10 and 10A, and the surrounding vehicle detection unit 30 have to perform image processing, etc. in real time. Thus, it is desirable that the obstacle detection units 10 and 10A, and the surrounding vehicle detection unit 30 include a System on Chip (SoC) configured to perform high-speed calculation processing, and a memory, etc. for the calculation processing.

Allowing the server to carry out the processing to be performed by the obstacle detection units 10 and 10A, and the surrounding vehicle detection unit 30 makes it possible to eliminate circuits of the obstacle detection units 10 and 10A, and the surrounding vehicle detection unit 30. This leads to reduction in the costs of the travel control apparatuses 1 and 1A.

Moreover, it is possible to eliminate the SoC configured to carry out the high-speed calculation processing, and the memory, etc. This leads to reduction in power consumption by the travel control apparatuses 1 and 1A.

Furthermore, it is possible to eliminate the circuits of the obstacle detection units 10 and 10A, and the surrounding vehicle detection unit 30. This leads to reduction in a weight of the travel control apparatuses 1 and 1A.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

As used herein, the term "collision" may be used interchangeably with the term "contact".

The obstacle detection units 10 and 10A, the passability determination unit 20, the surrounding vehicle detection unit 30, and the travel control units 40 and 40A illustrated in FIGS. 1 and 11 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the obstacle detection units 10 and 10A, the passability determination unit 20, the surrounding vehicle detection unit 30, and the travel control units 40 and 40A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM.

The ASIC is an integrated circuit (IC) customized to perform, and the FPGA is an integrated circuit designed to be configured after manufacturing in order to perform, all or a part of the functions of the obstacle detection units 10 and 10A, the passability determination unit 20, the surrounding vehicle detection unit 30, and the travel control units 40 and 40A illustrated in FIGS. 1 and 11.

The invention claimed is:

1. A travel control apparatus to be applied to a vehicle, the travel control apparatus comprising:
   a passability determination unit configured to determine whether an obstacle located on a lane on which the vehicle is currently traveling is avoidable by the vehicle without departing from the lane based on (1) a travelable width, defined as a width of a region within the lane through which the vehicle is able to pass, the region being defined between an obstacle and either a lane boundary or another obstacle, (2) a vehicle width of the vehicle, and (3) a margin, defined as a distance between the vehicle and the obstacle when the vehicle passes by the obstacle; and
   a travel control unit configured to control the vehicle to avoid the obstacle based on (1) a result of the determination by the passability determination unit, (2) an obstacle-reaching distance, the obstacle-reaching distance being a distance from the vehicle to the obstacle on the lane, and (3) surrounding vehicle data including positions and travel speeds of surrounding vehicles traveling on the lane and an adjacent lane,
   wherein, when the passability determination unit determines that the obstacle is avoidable by the vehicle within the lane, the travel control unit is configured to:
   (1) calculate a time difference between (a) a first estimated time at which the vehicle is expected to pass by the obstacle and (b) a second estimated time at which one of the surrounding vehicles is expected to pass by the obstacle, based on the obstacle-reaching distance and travel speeds of the vehicle and the one of the surrounding vehicles; and
   (2) control a travel speed of the vehicle such that the time difference becomes equal to or greater than a predetermined threshold, the travel speed being controlled to prevent the vehicle and the one of the surrounding vehicles from becoming side by side when the vehicle passes by the obstacle.

2. The travel control apparatus according to claim 1, wherein
   the margin is determined based on the travel speed of the vehicle.

3. A travel control apparatus to be applied to a vehicle, the travel control apparatus comprising:
   a passability determination unit configured to perform a determination as to whether or not an obstacle located on a vehicle lane on which the vehicle travels is avoidable within the vehicle lane on which the vehicle is currently traveling, based on a travelable width, a vehicle width of the vehicle, and a margin, the travelable width being a width of a travelable region within the vehicle lane, with one of both sides of the travelable region defined by the obstacle, and the margin being a distance from the vehicle to the obstacle when the vehicle passes by the obstacle; and
   a travel control unit configured to carry out a travel control to allow the vehicle to travel while avoiding the obstacle, based on a result of the determination by the passability determination unit, an obstacle-reaching distance, and surrounding vehicle data, the obstacle-reaching distance being a distance from the vehicle to the obstacle located on the vehicle lane on which the vehicle travels, and the surrounding vehicle data including data regarding positions and travel speeds of respective surrounding vehicles traveling on the vehicle lane on which the vehicle travels and an adjacent vehicle lane, wherein the travel control unit is configured to, when the passability determination unit determines that the obstacle is avoidable within the vehicle lane on which the vehicle is currently traveling, control a travel speed of the vehicle to keep the vehicle, any one of the surrounding vehicles, and the obstacle from becoming side by side when the vehicle passes by the obstacle, and wherein the travel control unit is configured to, when the passability determination unit determines that the obstacle is unavoidable within the vehicle lane on which the vehicle is currently traveling,
- determine, based on the surrounding vehicle data, whether or not any one of the surrounding vehicles is approaching from behind at a higher speed than the travel speed of the vehicle, and
- upon determining that any one of the surrounding vehicles is approaching from behind at the higher speed than the travel speed of the vehicle, carry out a speed control to raise the travel speed of the vehicle to allow a difference in the travel speed between the vehicle and the relevant one of the surrounding vehicles to become smaller than a predetermined value, and afterwards, carry out the travel control to allow the vehicle to travel while avoiding the obstacle.

4. The travel control apparatus according to claim 2, wherein the travel control unit is configured to, when the passability determination unit determines that the obstacle is unavoidable within the vehicle lane on which the vehicle is currently traveling,
- determine, based on the surrounding vehicle data, whether or not any one of the surrounding vehicles is approaching from behind at a higher speed than the travel speed of the vehicle, and
- upon determining that any one of the surrounding vehicles is approaching from behind at the higher speed than the travel speed of the vehicle, carry out a speed control to raise the travel speed of the vehicle to allow a difference in the travel speed between the vehicle and the relevant one of the surrounding vehicles to become smaller than a predetermined value, and afterwards, carry out the travel control to allow the vehicle to travel while avoiding the obstacle.

5. The travel control apparatus according to claim 3, wherein
the travel control unit is configured to, in carrying out the speed control to raise the travel speed of the vehicle, determine whether or not a vehicle lane for the vehicle to avoid the obstacle is enterable, based on the obstacle-reaching distance and the surrounding vehicle data, and
upon determining that the vehicle lane for the vehicle to avoid the obstacle is unenterable, carry out a control to stop the vehicle, let the surrounding vehicle pass by, and afterwards, carry out the travel control to allow the vehicle to travel while avoiding the obstacle.

6. The travel control apparatus according to claim 4, wherein
the travel control unit is configured to, in carrying out the speed control to raise the travel speed of the vehicle, determine whether or not a vehicle lane for the vehicle to avoid the obstacle is enterable, based on the obstacle-reaching distance and the surrounding vehicle data, and
upon determining that the vehicle lane for the vehicle to avoid the obstacle is unenterable, carry out a control to stop the vehicle, let the surrounding vehicle pass by, and afterwards, carry out the travel control to allow the vehicle to travel while avoiding the obstacle.

7. A travel control apparatus to be applied to a vehicle, the travel control apparatus comprising circuitry configured to:
determine whether an obstacle located on a lane on which the vehicle is currently traveling is avoidable by the vehicle without departing from the lane based on (1) a travelable width, defined as a width of a region within the lane through which the vehicle is able to pass, the region being defined between an obstacle and either a lane boundary or another obstacle, (2) a vehicle width of the vehicle, and (3) a margin defined as a distance between the vehicle and the obstacle when the vehicle passes by the obstacle; and
control the vehicle to avoid the obstacle based on (1) a result of the determination, (2) an obstacle-reaching distance, the obstacle-reaching distance being a distance from the vehicle to the obstacle on the lane, and (3) surrounding vehicle data including positions and travel speeds of surrounding vehicles traveling on the lane and an adjacent lane,
wherein, when the circuitry determines that the obstacle is avoidable by the vehicle within the lane, the circuitry is configured to:
(1) calculate a time difference between (a) a first estimated time at which the vehicle is expected to pass by the obstacle and (b) a second estimated time at which one of the surrounding vehicles is expected to pass by the obstacle, based on the obstacle-reaching distance and travel speeds of the vehicle and the one of the surrounding vehicles; and
(2) control a travel speed of the vehicle such that the time difference becomes equal to or greater than a predetermined threshold, the travel speed being controlled to prevent the vehicle and the one of the surrounding vehicles from becoming side by side when the vehicle passes by the obstacle.

* * * * *